(12) United States Patent
Mulukutla et al.

(10) Patent No.: US 7,661,483 B2
(45) Date of Patent: Feb. 16, 2010

(54) METAL OXIDE NANOPARTICLES FOR SMOKE CLEARING AND FIRE SUPPRESSION

(75) Inventors: Ravichandra S. Mulukutla, Manhattan, KS (US); Paul S. Malchesky, Painesville, OH (US); Ronaldo Maghirang, Manhattan, KS (US); John S. Klabunde, Manhattan, KS (US); Kenneth J. Klabunde, Manhattan, KS (US); Olga Koper, Manhattan, KS (US)

(73) Assignee: NanoScale Corporation, Manhattan, KS (US)

( * ) Notice: Subject to any disclaimer, the term of this patent is extended or adjusted under 35 U.S.C. 154(b) by 78 days.

(21) Appl. No.: 11/843,330

(22) Filed: Aug. 22, 2007

(65) Prior Publication Data

US 2008/0210444 A1    Sep. 4, 2008

Related U.S. Application Data

(62) Division of application No. 11/252,943, filed on Oct. 18, 2005, now Pat. No. 7,276,640.

(60) Provisional application No. 60/619,830, filed on Oct. 18, 2004, provisional application No. 60/620,517, filed on Oct. 20, 2004.

(51) Int. Cl.
*A62C 3/00*   (2006.01)
*A62C 31/00*  (2006.01)
*A62D 1/00*   (2006.01)
*A62D 1/02*   (2006.01)
*A62D 1/08*   (2006.01)

(52) U.S. Cl. .................. 169/47; 169/46; 252/4; 252/5; 252/8; 252/8.05

(58) Field of Classification Search .............. 252/4, 252/5, 8; 169/46, 47
See application file for complete search history.

(56) References Cited

U.S. PATENT DOCUMENTS

| | | | | |
|---|---|---|---|---|
| 5,053,146 | A * | 10/1991 | Yamaguchi | 252/2 |
| 5,173,454 | A | 12/1992 | Rittler | 501/5 |
| 6,001,270 | A * | 12/1999 | Stephens et al. | 252/2 |
| 6,417,423 | B1 | 7/2002 | Koper et al. | 588/313 |
| 6,653,356 | B2 * | 11/2003 | Sherman | 516/90 |
| 6,740,697 | B1 * | 5/2004 | Brenner et al. | 524/166 |
| 6,827,766 | B2 | 12/2004 | Carnes et al. | 106/15.04 |
| 6,828,366 | B2 * | 12/2004 | Seidel et al. | 524/127 |
| 6,860,924 | B2 | 3/2005 | Rajagopalan et al. | 96/154 |
| 6,887,302 | B2 | 5/2005 | Rajagopalan et al. | 95/116 |

(Continued)

OTHER PUBLICATIONS

Building & Fire Research Laboratory, Activities, Accomplishments & Recognitions, National Institute of Standards and Technology, pp. 37-38 (2003).

(Continued)

*Primary Examiner*—Joseph D Anthony
(74) *Attorney, Agent, or Firm*—Hovey Williams LLP

(57) ABSTRACT

Methods of reducing smoke levels in smoke-affected areas, reducing the level of toxic compounds produced by fires, fire suppression, and increasing flame retardancy. In particular, methods according to the present invention comprise dispersing nanocrystalline particles in the areas affected by smoke for sorption of smoke particulates and toxic compounds produced from a fire. The nanocrystalline particles are also effective for use in methods of fire suppression and flame retardancy.

8 Claims, 15 Drawing Sheets

U.S. PATENT DOCUMENTS

| | | | |
|---|---|---|---|
| 2002/0005145 A1* | 1/2002 | Sherman | 106/436 |
| 2003/0082379 A1* | 5/2003 | Hrubesh et al. | 428/375 |
| 2004/0120884 A1* | 6/2004 | Sherman | 423/608 |
| 2006/0020064 A1* | 1/2006 | Bauer et al. | 524/115 |
| 2006/0091349 A1* | 5/2006 | Mulukutla et al. | 252/2 |
| 2006/0254463 A1* | 11/2006 | Luginsland et al. | 106/482 |
| 2007/0152201 A1* | 7/2007 | Zhou et al. | 252/609 |
| 2007/0163787 A1* | 7/2007 | Posson et al. | 169/85 |

OTHER PUBLICATIONS

Tuovinen, Heimo et al., Modelling of hydrogen cyanide formation in room fires, Fire Safety Journal 39 (2004), pp. 737-755 (2004).

Hertzberg, Tommy et al., Particles from Fires—a screening of common materials found in buildings, Fire and Materials 2003, vol. 27, pp. 295-314.

Blomqvist, Per et al., Isocyanates, aminoisocyanates and amines from fires—a screening of common materials found in buildings, Fire and Materials 2003, vol. 27, pp. 275-294.

Fastact ("Chemical Hazard Containment and Neutralization System") Technical Report; prepared by NanoScale Materials, Inc., Publication date Mar. 2004.

Lanz et al. entitled "Armed Forces" found in Fire Chief, Every Department, Every Leader, Publication Date Nov. 1, 2003.

* cited by examiner

METAL OXIDE NANOPARTICLES FOR SMOKE CLEARING AND FIRE SUPPRESSION

RELATED APPLICATIONS

This application is a divisional of U.S. patent application Ser. No. 11/252,943, filed Oct. 18, 2005 now U.S. Pat. No. 7,276,640, which claims the benefit of U.S. Provisional Application No. 60/619,830, filed Oct. 18, 2004, and U.S. Provisional Application No. 60/620,517, filed Oct. 20, 2004, all of which are incorporated by reference herein.

FEDERALLY SPONSORED RESEARCH/DEVELOPMENT PROGRAM

This invention was made with government support under contract M67854-02-D-1110, awarded by the United States Department of Defense, Marine Corps System Command. The government has certain rights in the invention.

BACKGROUND OF THE INVENTION

1. Field of the Invention

The present invention generally pertains to methods of removing smoke and toxic compounds produced from fires, for general fire suppression, and fire retardancy. More particularly, methods according to the present invention involve the use of nanocrystalline materials, alone or in combination with other conventional materials, to achieve these purposes.

2. Description of the Prior Art

The hazards to human and animal life and health associated with fires, smoke, and toxic materials produced by fires are well known. Inhalation of toxic gases in smoke is the primary cause of fatalities in most fires. Fire is a complex, dynamic, physiochemical phenomenon and is a result of a rapid chemical reaction generating smoke, heat, flame and light. Each fire exhibits individual characteristics which depend on the types of burning materials and environmental conditions. Smoke is a complex of particular matter, as well as a variety of invisible combustion gases and vapors suspended in the fire atmosphere. Fire, smoke and the toxic compounds associated therewith can also cause poor visibility conditions thereby hampering the conduct of military and civilian ground operations (i.e., battlefield operations, search and rescue operations, aircraft operations, etc.).

Within the fire community it has long been an accepted fact that the health hazard from fire smoke is due mainly to its content of CO. Lately, this scenario has also come to include hydrogen cyanide (HCN). Isocyanates have also become the subject of focus as they are used for manufacturing polyurethanes and frequently used for manufacturing glues and lacquers. Isocyanates are known to induce asthma in people exposed to even relatively small amounts. NIOSH provide an IDLH of 2.5 ppm for 2,4-diisocyanate and 3.0 ppm for methyl isocyanate, for comparison, the IDLH given for HCN is 50 ppm and for CO 1200 ppm. Materials such as glass wool insulation, mineral wool insulation, and products utilizing nitrogen containing (urea based) binders and wood fibers have been found to release significant amounts of isocyanates (isocyanic acid and methyl isocyanate) when combusted.

In addition, smoke and toxic chemicals can be produced by a number of industrial processes. Newer environmental standards require reduction of the amounts of these materials from industrial flue gases prior to release into the atmosphere.

Conventional dry chemical systems for fire suppression have involved the use of pressurized containers including various dry compounds such as ammonium phosphate, ammonium sulfate, calcium carbonate, magnesium aluminosilicate, mono ammonium phosphate, sodium bicarbonate, potassium bicarbonate, and muscovite mica. However, these systems at best are only marginally effective at smoke removal and do not address the hazards presented by fire-produced toxic compounds.

Therefore, there is a real an unfulfilled need in the art for methods of smoke-clearing, fire suppression, flame retardancy and sorption of toxic chemicals produced by fires and industrial processes.

SUMMARY OF THE INVENTION

The present invention overcomes the above problems by providing methods for fire suppression, smoke clearing, flame retardancy and removal of toxic materials formed by fires. In one aspect, the present invention provides a method of enhancing visibility in a smoke-affected area comprising, consisting of, or consisting essentially of the step of dispersing a quantity of nanocrystalline particles to the smoke-affected area for sorbing at least a portion of the smoke.

In another aspect, the present invention provides a method of removing toxic materials formed by a fire comprising from an area comprising, consisting of, or consisting essentially of dispersing a quantity of nanocrystalline particles in the area for sorbing at least one toxic material formed by the fire.

In yet another aspect, the present invention provides a method of fire suppression comprising, consisting of, or consisting essentially of the step of applying a quantity of nanocrystalline particles onto a fire.

In still another aspect, the present invention provides a method of improving the flame retardancy of an article comprising, consisting of, or consisting essentially of the step of applying to and/or incorporating into the article a quantity of flame retardant nanocrystalline particles.

BRIEF DESCRIPTION OF THE DRAWINGS

FIG. 6 is a graph showing the smoke clearing effectiveness (time to reach 90% opacity) of several RNPs v. relative aerodynamic size.

FIG. 7 is a graph showing the smoke clearing effectiveness (time to reach 80% opacity) of several RNPs v. relative aerodynamic size.

DETAILED DESCRIPTION OF THE PREFERRED EMBODIMENT

Figure 1:
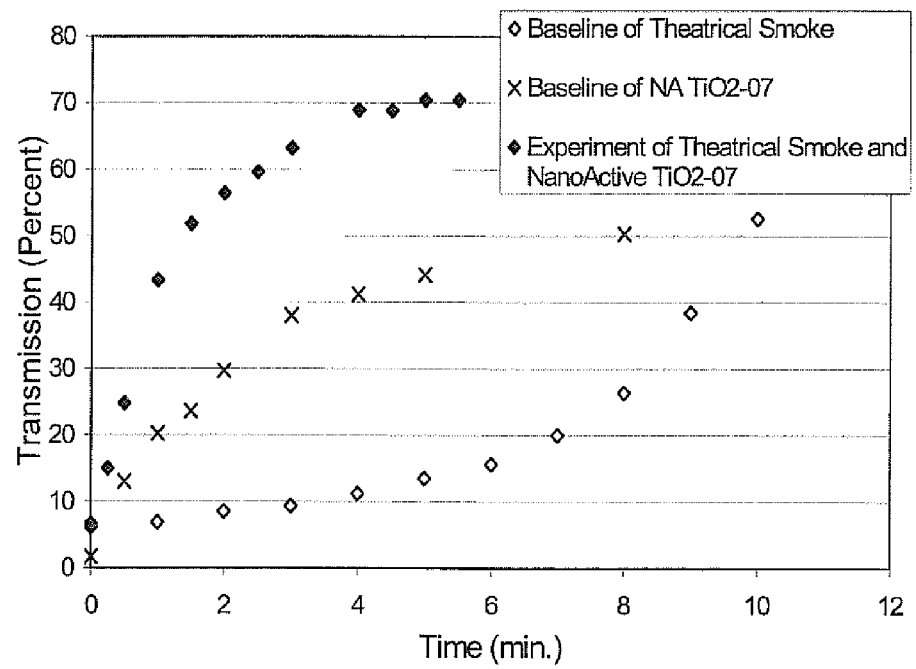
FIG. 1 is a graph of the rate of disappearance of theatrical smoke using NA $TiO_2$-07.

The present invention utilizes relatively high surface area nanocrystalline particles for reducing the levels of various compounds and materials produced by fires and for suppression of the fire itself. Smoke produced by a fire may contain, in addition to carbonaceous smoke particulates, various toxic compounds such as acrolein, toluene diisocyanate, formaldehyde, isocyanates, HCN, CO, NO, HF, and HCl. The present invention pertains to methods for clearing smoke in order to improve the visibility of an area and also to reduce the level of toxic compounds present in the area. The methods according to the present invention are also useful for suppressing the fire, including any smoldering embers or other material, which is producing the smoke and toxic compounds. These methods are applicable to open-air environments as well as closed environments (i.e., closed rooms, chambers, aircraft cabins, etc.).

Turning now to a first embodiment of the present invention, methods for clearing smoke from a smoke-affected area generally comprise the step of dispersing a quantity of nanocrystalline particles into the smoke affected area for sorbing at least a portion of the smoke, particularly the carbonaceous smoke particulates which tend to obscure visibility. Preferred nanocrystalline particles for use with (all aspects of) the present invention are selected from the group consisting of metal oxides, metal hydroxides, carbonates, bicarbonates, phosphorus, inorganic phosphorus compounds, boron compounds, antimony compounds, molybdenum compounds, titanium compounds, zirconium compounds, zinc compounds, sulfamates, sulfates, bromine compounds, chlorine compounds, and mixtures thereof. The metal oxides and metal hydroxides of Mg, Sr, Ba, Ca, Ti, Zr, Fe, V, Mn, Ni, Cu, Al, Si, Zn, Ag, Mo, Sb, and mixtures thereof are the most preferred nanocrystalline materials. The hydroxides, carbonates, and bicarbonates of sodium, aluminum, magnesium and calcium are also particularly preferred. The nanocrystalline particles preferably present particles having crystallites sizes of less than about 25 nm, more preferably between about 1-20 nm, and most preferably between about 2-10 nm. The nanocrystalline particles preferably exhibit a Brunauer-Emmett-Teller (BET) multipoint surface area of at least about 15 m$^2$/g, more preferably at least about 70 m$^2$/g, and most preferably from about 200-850 m$^2$/g.

Methods according to the present invention are highly effective in improving the visibility in a smoke-affected area even if the area presents an opacity of at least about 95% prior to dispensing the nanocrystalline particles into the area. Preferably, methods as described herein result in a 15% decrease in opacity of an area in less than about 80% of the time in which the area would achieve the same reducing in opacity in the absence of the inventive smoke-clearing activities. For example, if an area having an opacity of 100% were left alone and the opacity improved to 85% in 10 minutes, methods according to the present invention would preferably be capable of achieving an 85% opacity for the same area in 8 minutes or less. More preferably, the 15% decrease in opacity occurs in less than about 70% of the time that would otherwise occur naturally, even more preferably the decrease in opacity occurs in less than about 50% of this time, and most preferably the decrease in opacity occurs in less than about 40% of this time.

In particularly preferred embodiments of the present invention, an area with an opacity of between about 95-100% can be reduced to an opacity of less than 85% within about 5 minutes, more preferably within about 3 minutes, and most preferably within about 2 minutes of dispensing the nanocrystalline particles within the area. As explained in the following Examples, the type of smoke involved and the type of nanocrystalline particles used are factors which determine the rate of smoke-clearing.

The smoke-clearing effectiveness can also be influenced by the amount of nanocrystalline particles dispensed into the area (i.e., the mass concentration of nanoparticles), the aerodynamic geometric mean diameter (GMD) of the particles, and the settling velocity of the particles. Preferably, a sufficient quantity of nanocrystalline particles should be dispensed in an area to provide a mass concentration of particles of at least about 0.1 g/m$^3$, more preferably between about 0.5-10 g/m$^3$, and most preferably between about 1-5 g/m$^3$.

The aerodynamic geometric mean diameter refers to the aerodynamic diameter which divides the particles of an aerosol in half based on the weight of the particles. Fifty percent of the particles by weight will be larger than the median diameter and 50 percent of the particles will be smaller than the median diameter. The median diameter and its geometric standard deviation are used to statistically describe the particle size distribution of an aerosol based on the weight and size of the particles. With respect to several of the preferred nanocrystalline particles, the aerodynamic geometric mean diameters are considerably larger than the primary sizes thereof. This indicates that the nanocrystalline particles tend to agglomerate after deployment. Preferably, the nanocrystalline particles present an aerodynamic geometric mean diameter of between about 1-30 μm, more preferably between about 2-25 μm, and most preferably between about 4-20 μm. The size distribution of nanocrystalline particles may change with time as a result of collisions and sedimentation. Therefore, it is preferred that the geometric mean diameters of the particles be calculated within the first 30-60 seconds after deployment.

Settling velocity for a particular nanocrystalline particle is related at least in part to the aerodynamic geometric mean diameter value thereof. Typically, the larger the particle, the higher the particle's settling velocity. It is preferable for the nanocrystalline particles used in accordance with the present invention to present a settling velocity between about 0.001-5 cm/s, more preferably between about 0.1-4.5 cm/s, and most preferably between about 0.5-3 cm/s. If the settling velocity of the particle is too low, the particle may tend to remain suspended in the air and actually contribute to or enhance obscuration of the area in which it is deployed. If the settling velocity of the particle is too high, the particle may not remain suspended long enough to effectively contact and sorb the smoke particulates. Therefore, selection of particles with settling velocities within the above ranges may enhance the effectiveness of smoke-clearing operations.

Delivery of the nanocrystalline particles into the smoke-affected area may be achieved through any number of dispersing means known to those of skill in the art. However, one particularly preferred means of dispersing the particles is deployment from a pressurized container. Preferably, the nanocrystalline particles are dispensed from the pressurized container at a pressure of between about 20-3000 psi, more preferably between about 50-500 psi, and most preferably between about 100-300 psi. The container may be pressurized with a propellant or a delivery gas. Preferred delivery gases include nitrogen, argon, air, carbon dioxide, and helium, with nitrogen being particularly preferred. The pressurized container should comprise an appropriate nozzle which will resist clogging during deployment of the particles. A preferred delivery system is exemplified by the products distributed under the name FAST ACT® by NanoScale Materials, Inc., Manhattan, Kans. The nanocrystalline particles may also be formed into granules and dispensed accordingly. Preferably, these granules present sizes between about 125-500 µm, more preferably between about 140-400 µm, and most preferably between about 180-250 µm.

The nanocrystalline particles can also be delivered to the affected area through manual dispersion from an non-pressurized container. For example, the nanocrystalline particles may be dispersed by sprinkling or broadcasting in a smoke-affected area.

In another embodiment of the present invention, the aforementioned nanocrystalline particles may be used for sorbing at least one toxic material formed by a fire. Such toxic materials include acrolein, toluene diisocyanate, formaldehyde, isocyanates, HCN, CO, NO, HF, HCl, anhydrous ammonia, chlorine, alkoxides (e.g., ethylene oxide), nitrogen dioxide, sulfur dioxide, mercaptans (e.g., methyl mercaptan), and mixtures thereof. In many instances the toxic compounds may be mixed with smoke also formed by the fire. The nanocrystalline particles may be in the form of any of the nanocrystalline particles previously described herein and may be deployed according to any of the aforementioned dispersal or application means.

In yet another embodiment of the present invention, the aforementioned nanocrystalline particles may be used in fire suppression. As used herein, the term "fire suppression" includes the suppression and/or extinguishing of open flames and/or of smoldering materials which may or may not exhibit an actual flame. The nanocrystalline particles may be in the form of any of the above nanocrystalline particles previously described herein and may be deployed according to any of the aforementioned dispersal or application means. In addition, the present nanoparticles may be combined with conventional dry chemical fire suppression systems containing inorganic chemicals like ammonium phosphate, ammonium sulfate, calcium carbonate, magnesium aluminosilicate, and mono ammonium phosphate. The nanocrystalline particles may be combined with these conventional dry fire suppression components in an amount from about 1-99% by weight, more preferably from about 10-80% by weight, and most preferably between 30-70% by weight.

In still another embodiment of the present invention, the aforementioned nanocrystalline particles may be used in improving the flame retardancy of an article. The article may be a natural product (i.e., raw or relatively unprocessed materials), a manufactured article (e.g., textiles (clothing, upholstery), plastics, insulation, paints, papers, rubbers), or any combination thereof. The nanocrystalline particles may be applied to the outer surface of the article, incorporated into the article during its manufacture, or otherwise applied so that the particles penetrate the outer surface of the article so as to become intimately incorporated therewith.

In addition to the above-mentioned nanocrystalline particles, other preferred nanocrystalline particles for use in improving flame retardancy are metal oxides, metal hydroxides, carbonates, bicarbonates, phosphorus, inorganic phosphorus compounds, boron compounds, antimony compounds, molybdenum compounds, titanium compounds, zirconium compounds, zinc compounds, sulfamates, sulfates, bromine compounds, chlorine compounds, and mixtures thereof. Particularly preferred materials include aluminum hydroxide (alumina trihydrate), magnesium hydroxide, antimony trioxide, antimony oxychloride, antimony trichloride, antimonypentoxide, sodium antimonate, red phosphorus, ammonium polyphosphate, boric acid, sodium borate (borax), zinc borate, zinc stannate, zinc hydroxy-stannate, ammonium sulfamate ($NH_4SONH_2$), ammonium bromide, polybrominated diphenyl ether, melamine (and salts thereof), melamine cyanurate, and guanidine.

The nanocrystalline particles exhibit the same range of physical characteristics as previously described herein, particularly with respect to crystallite size and surface area. When incorporated into or applied onto an article, the nanocrystalline particles preferably comprise from about 0.01-25% of the weight of the entire article, more preferably from about 0.05-10% by weight, and most preferably from about 0.1-5% by weight.

EXAMPLES

The following examples set forth preferred methods according to the present invention. It is to be understood, however, that these examples are provided by way of illustration and nothing therein should be taken as a limitation upon the overall scope of the invention.

Example 1

In this example, UV-Vis experiments were performed to determine the kinetic rate of adsorption of combustion smoke and to investigate selective adsorption of different nanoparticle metal oxide powders. These qualitative investigative experiments were performed using aspirators with cylindrical flasks.

UV-Vis experiments: This study was carried out using the UV-Vis technique. Ten NanoActive® materials available from NanoScale Materials, Inc., Manhattan, Kans., were tested. These materials are nanocrystalline in nature and exhibit relatively high surface areas. A basic characterization of these materials is provided in Table A, however, product information sheets available from NanoScale Materials, Inc. with complete characterizations of the respective materials are incorporated by reference herein. "NanoActive®" materials are also referred to herein by the designation "NA" for convenience.

TABLE A

Characterization of NanoActive ® Materials (crystallite size and surface area)

| Material | Average crystallite size | Average surface area (by BET method) |
| --- | --- | --- |
| NanoActive ® MgO | ≦8 nm | ≧230 m$^2$/g |
| NanoActive ® MgO Plus | ≦4 nm | ≧600 m$^2$/g |
| NanoActive ® CaO | ≦40 nm | ≧20 m$^2$/g |
| NanoActive ® Plus CaO | ≦20 nm | ≧90 m$^2$/g |
| NanoActive ® CuO | ≦8 nm | ≧65 m$^2$/g |
| NanoActive ® ZnO | ≦10 nm | ≧70 m$^2$/g |
| NanoActive ® Al$_2$O$_3$ | amorphous | ≧275 m$^2$/g |
| NanoActive ® Al$_2$O$_3$ Plus | amorphous | ≧550 m$^2$/g |
| NanoActive ® TiO$_2$-07 | ≦20 nm | ≧400 m$^2$/g |
| NanoActive ® TiO$_2$-12 | amorphous | ≧500 m$^2$/g |
| NanoActive ® CeO$_2$ | ≦7 nm | ≧50 m$^2$/g |

Components of smoke created from the burning of paper were dissolved in hexane, and some of the components exhibited UV-Vis bands at 222 and 274 nm. The relative reactivities were measured by the change in absorbance from 0 to 15 minutes of contact time. This is indicated by $\Delta A_{0-15}$. The change of absorbance is the difference between the absorbance at time zero and the absorbance at 15 minutes or simply:

$$\Delta A_{0-15} = A_0 - A_{15}$$

The greater the difference in absorbance, the higher the reactivity of the material. As shown in Table 1, materials with the most significant difference in both bands were NanoActive® Al$_2$O$_3$ Plus, NanoActive® MgO, NanoActive® TiO$_2$, and NanoActive® Plus MgO.

TABLE 1

Change in the absorbance values of smoke components with NanoActive ® materials

| NanoActive ® Material | $\Delta A_{0 \to 15}$ @ $\lambda = 222$ nm | NanoActive ® Material | $\Delta A_{0 \to 15}$ @ $\lambda = 274$ nm |
|---|---|---|---|
| NanoActive ® Al$_2$O$_3$ Plus | 1.479 | NanoActive ® MgO | 0.306 |
| NanoActive ® MgO | 1.337 | NanoActive ® Al$_2$O$_3$ Plus | 0.253 |
| NanoActive ® TiO$_2$ | 1.060 | NanoActive ® MgO Plus | 0.243 |
| NanoActive ® MgO Plus | 1.017 | NanoActive ® CaO Plus | 0.198 |
| NanoActive ® Al$_2$O$_3$ | 0.810 | NanoActive ® TiO$_2$ | 0.195 |
| NanoActive ® CaO Plus | 0.509 | NanoActive ® Al$_2$O$_3$ | 0.165 |
| NanoActive ® CuO | 0.412 | NanoActive ® CaO | 0.139 |
| NanoActive ® CeO$_2$ | 0.380 | NanoActive ® CuO | 0.099 |
| NanoActive ® ZnO | 0.315 | NanoActive ® CeO$_2$ | 0.065 |
| NanoActive ® CaO | 0.258 | NanoActive ® ZnO | 0.053 |

Visual smoke-reduction experiments were conducted in cylindrical flasks. Combustion smoke from burning paper was drawn with an aspirator and reduction of smoke was carried out with NanoActive® materials. The mass used was 0.60 g in each study, which was coated on the walls of the flask. Combustion smoke was introduced using aspirator into the experimental (the flask containing NanoActive® material) and control flasks (without NanoActive® material), simultaneously. Disappearance of smoke was observed for 10 minutes in each flask. It was determined in general that during the first four minutes, smoke disappearance in the experimental flask was about two minutes ahead of the control. Table 2 gives the rankings of the materials to clear combustion smoke with NanoActive® TiO$_2$-07, NanoActive® MgO, and NanoActive® Al$_2$O$_3$ Plus achieving the best results.

TABLE 2

Visual observations of combustion smoke-reduction experiments in cylindrical flasks using NanoActive ® materials.

| Ranking according to both observers | NanoActive ® Material | Observer 1 data | | Observer 2 data | | Summary |
|---|---|---|---|---|---|---|
| | | LEVEL | $\Delta t_{con.-exp.}$ (sec.) | LEVEL | $\Delta t_{con.-exp.}$ (sec.) | |
| 1 | NanoActive ® TiO$_2$-07 | 1 | 160 | 1 | NA | This material had an extremely substantial clearance in the beginning in comparison to the rest of the NanoActive ® materials. It did however slow down toward the end. |
| | | 2 | 135 | 2 | NA | |
| | | 3 | 50 | 3 | NA | |
| | | 4 | −10 | 4 | NA | |
| 2 | NanoActive ® MgO | 1 | 60 | 1 | 60 | This material cleared smoke from the start and consistently cleared smoke throughout the entire experiment at approximately the same rate. |
| | | 2 | 80 | 2 | 77 | |
| | | 3 | 90 | 3 | ND | |
| | | 4 | 90 | 4 | ND | |

TABLE 2-continued

Visual observations of combustion smoke-reduction experiments in cylindrical flasks using NanoActive ® materials.

| Ranking according to both observers | NanoActive ® Material | Observer 1 data | | Observer 2 data | | Summary |
|---|---|---|---|---|---|---|
| | | LEVEL | $\Delta t_{con.-exp.}$ (sec.) | LEVEL | $\Delta t_{con.-exp.}$ (sec.) | |
| 3 | NanoActive ® Al$_2$O$_3$ Plus | 1 | 55 | 1 | 70 | This material cleared smoke from the start at a fairly high rate. However, unlike the NanoActive ® MgO, it was observed to slow down toward the middle or end of the experiment. |
| | | 2 | 85 | 2 | 49 | |
| | | 3 | 80 | 3 | 49 | |
| | | 4 | 69 | 4 | 93 | |
| 4 | NanoActive ® CaO | 1 | 50 | 1 | 66 | This material stayed fairly consistent throughout the experiment. However, unlike the previous two, it did not have a high clearance rate. |
| | | 2 | 40 | 2 | 50 | |
| | | 3 | 75 | 3 | 69 | |
| | | 4 | 40 | 4 | 13 | |
| 5 | NanoActive ® TiO$_2$-12 | 1 | 30 | 1 | NA | This material stayed fairly consistent throughout the experiment. The difference from the NanoActive ® CaO (preceding adsorbent) is that the numbers were lower. |
| | | 2 | 30 | 2 | NA | |
| | | 3 | 45 | 3 | NA | |
| | | 4 | 30 | 4 | NA | |
| 6 | NanoActive ® Al$_2$O$_3$ | 1 | 45 | 1 | 35 | This material started off at a decent rate of clearance; however, it seemed to quit early in the experiment. This is indicated by the −22 that was observed by observer 2. The previous three never quit clearance because all their numbers are positive. |
| | | 2 | 60 | 2 | 66 | |
| | | 3 | 85 | 3 | 38 | |
| | | 4 | 60 | 4 | −22 | |
| 7 | NanoActive ® MgO Plus | 1 | 0 | 1 | 8 | This material started off without hardly any smoke clearance, which is indicated by 0 in levels 1 and 2 made by observer 1 and the small positive numbers by observer 2. After the third level, however, the smoke began to clear at a fairly significant rate. |
| | | 2 | 0 | 2 | 17 | |
| | | 3 | 60 | 3 | 60 | |
| | | 4 | 80 | 4 | 81 | |
| 8 | NanoActive ® CaO Plus | 1 | −30 | 1 | −16 | Unlike the previous material, this material did not clear smoke at all until the 3$^{rd}$ and 4$^{th}$ levels. The negative numbers in the first and second levels (observer 1) indicate that the control flask was clearing more rapidly than the experimental flask. Only toward the end of the experiment (levels 3 and 4) did the material begin to clear the smoke. |
| | | 2 | −10 | 2 | 10 | |
| | | 3 | 30 | 3 | 10 | |
| | | 4 | 60 | 4 | 75 | |
| 9 | NanoActive ® ZnO | 1 | 15 | 1 | NA | This material performed very poorly. It cleared somewhat at the beginning of the experiment, however, completely stopped clearly after approximately 2.5 minutes. |
| | | 2 | 15 | 2 | NA | |
| | | 3 | −25 | 3 | NA | |

Example 2

In this example, smoke-clearing experiments, utilizing different kinds of smoke, were conducted in a small chamber to determine the kinetic rate of smoke disappearance using NanoActive® materials.

A. Theatrical Smoke

These experiments were conducted in a 27×27×28-inch metal chamber. A specified concentration of theatrical smoke was introduced into the chamber using a fog generator. The NanoActive® materials were then delivered into the chamber using an 80-psi pressurized canister. About 30 grams of materials were charged in the canister. Approximately 5-10 grams were delivered. The optical transmission was then measured over time. The transmission values were then compared to the transmission values from the baseline experiment.

The NanoActive® materials were ranked according to the 15% transmission ratio (t*$_{15}$ ratio). The reason 15% transmission was used is because it is the value at which visual clearance takes place. The t*$_{15}$ ratio is simply the time it takes the experimental transmission to reach 15% transmission (denoted by t$_{exp}$), divided by the time it takes for the baseline of the smoke itself to reach 15% (denoted by $t_{baseline}$). The equation is as follows:

$$t^*_{15} \text{ratio} = t_{exp}/t_{baseline(smoke\ alone)}$$

If the $t^*_{15}$ ratio<1, then there was a smoke reduction. If the $t^*_{15}$ ratio>1, then there was an enhancement of obscuration. If the $t^*_{15}$ ratio=1, then the material had no effect on the smoke. The smaller the $t^*_{15}$ ratio value, the more efficient the material is at smoke reduction.

In a first series of tests, theatrical smoke was used as the control to evaluate the disappearance of smoke without exposure to NanoActive® materials. It was used as the baseline to the experiment when NanoActive® materials were exposed to the smoke.

In a second series of tests, the decrease of obscuration experienced with the NanoActive® material alone was tested to determine the obscuration that the NanoActive® material possesses. This test provided information on the relative obscuration of NanoActive® materials to smoke.

In a third series of tests, the decrease of obscuration with both the smoke (theatrical) and NanoActive® material was tested to determine the rate of smoke disappearance due to NanoActive® material exposure. If the rate of transmission increase is larger for the experimental than the baseline control then there is a reduction in smoke. If the rate of transmission increase is smaller for the experimental than the baseline control, then there is no reduction in smoke. FIG. 1 summarizes an experiment that was carried out using theatrical smoke and NanoActive® TiO₂-07. As shown in FIG. 1, there was a significant increase in transmission of the experimental (indicated by the solid diamond), compared to the baseline control (indicated by the hollow diamond). In fact, the transmission in the experimental portion of the experiment reached the same value (% T=15) in 15 seconds as the control did in six minutes (again, % T=15). Therefore, the NanoActive® TiO₂-07 hads an obscuration decrease of about five minutes and 45 seconds. This is calculated taking the difference in time of the baseline (smoke) and time of the experiment at a given transmission value.

The $t^*_{15}$ calculated for NanoActive® TiO₂-07 was 0.04. NanoActive® Al₂O₃ Plus, also studied for theatrical smoke reduction, had a $t^*_{15}$ of 3.3, indicating that NanoActive® Al₂O₃ Plus behaved more like an obscurant than as an aid in clearing smoke.

B. Combustion Smoke

These experiments were conducted in a 27×28.5×27-inch metal chamber. A specified concentration of combustion smoke from burning paper was introduced into the chamber to reduce the down to 1.9%, then the NanoActive® materials were dispensed into the chamber using a pressurized canister as in the theatrical smoke. Approximately five to ten grams were delivered. The transmission values were then measured over time, and then compared to the transmission values from the baseline experiment. The NanoActive® materials were ranked according to the 15% transmission ratio ($t^*_{15}$ ratio). The results are shown in Table 3.

TABLE 3

Reduction of combustion smoke from burning paper using NanoActive ® materials studied in small chamber

| Ranking | NanoActive ® Material | $t^*_{15}$ | ΔT (° C.) | Mass Delivered (g) |
|---|---|---|---|---|
| 1 | #NanoActive ® TiO₂-07 | 0.50 | 1 | 10.9 |
| 2 | #NanoActive ® MgO Plus | 0.60 | 1 | 7.5 |
| 3 | NanoActive ® CuO | 0.65 | 0 | 15 |
| 4 | NanoActive ® TiO₂-12 | 0.68 | 0 | 12.8 |
| 5 | NanoActive ® CeO₂ | 0.75 | 0 | 3.7 |

TABLE 3-continued

Reduction of combustion smoke from burning paper using NanoActive ® materials studied in small chamber

| Ranking | NanoActive ® Material | $t^*_{15}$ | ΔT (° C.) | Mass Delivered (g) |
|---|---|---|---|---|
| 6 | NanoActive ® TiO₂-12/NanoActive ® MgO mixture | 0.8 | 0 | 5.7 |
| 7 | NanoActive ® Al₂O₃ | 1.1 | 0 | 9.8 |
| 8 | NanoActive ® ZnO | 1.2 | 0 | 7.8 |
| 9 | NanoActive ® MgO | 1.6 | 0 | 3.3 |
| 10 | NanoActive ® Al₂O₃ Plus | 2.0 | 0 | 8.2 |

Figure 2:
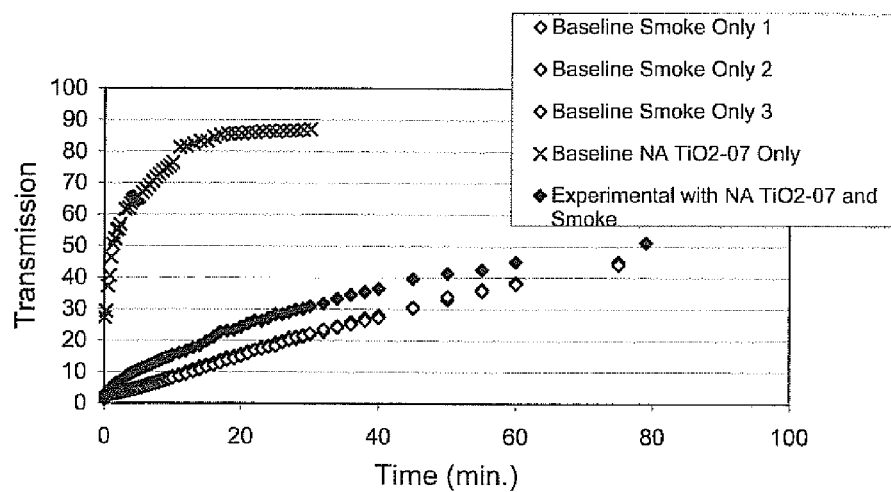
FIG. 2 is a graph showing the rate of disappearance of combustion smoke from burning paper using NA $TiO_2$-07.
Figure 3:
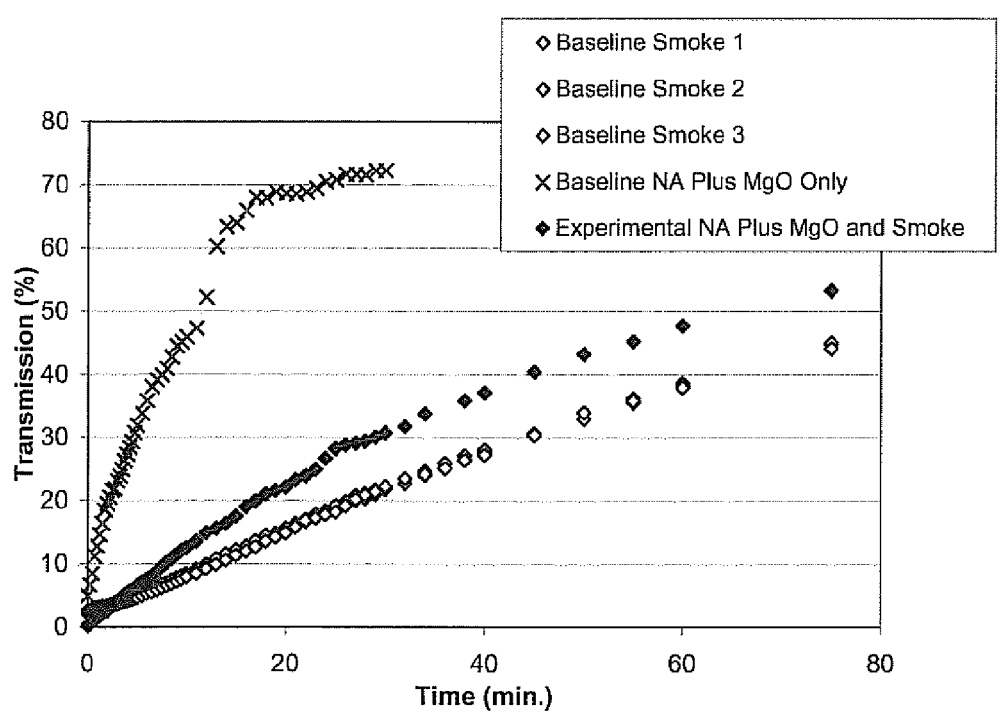
FIG. 3 is a graph showing the rate of disappearance of combustion smoke from burning paper using NA MgO Plus.

The marker "#" indicates a temperature increase when NanoActive® materials made contact with the combustion smoke. The best materials for reducing combustion smoke were the NanoActive® TiO₂-07 and NanoActive® MgO Plus. The NanoActive® TiO₂-07 (FIG. 2) reduced the smoke after 10 minutes. The NanoActive® Plus MgO (FIG. 3) reduced the smoke after approximately 12 minutes.

Of the two TiO₂ samples studied, one performed better than the other, suggesting that smoke reduction is more than just a chemical interaction. It is very likely that physical characteristics play a role as well. Physical characteristics of the material that may affect the smoke reduction capabilities of the material are the settling velocity of the materials and the charge of the materials.

C. Diesel Fog

These experiments were carried out the same way as the combustion smoke experiments. A specified concentration of atomized diesel was introduced in the same fashion as the theatrical, using a fog oil generator. The fog was introduced into the chamber until the transmission reached about 2.1%, then NanoActive® materials were dispensed into the chamber using a pressurized canister. The mass delivered in each experiment is shown in Table 4, which was varied because of the morphology of the material.

TABLE 4

Diesel oil fog reduction using NanoActive ® materials

| Ranking | NanoActive ® Material | $T^*_{15}$ | ΔT (° C.) | Mass Delivered (g) |
|---|---|---|---|---|
| 1 | #NanoActive ® TiO₂-07 | 0.04 | 1 | 7.8 |
| 2 | NanoActive ® Plus MgO | 0.38 | 0 | 8.0 |
| 3 | NanoActive ® TiO₂-12 | 0.51 | 0 | 2.5 |
| 4 | NanoActive ® CuO | 0.55 | 0 | 5.6 |
| 5 | NanoActive ® CeO₂ | 0.76 | 0 | 1.72 |
| 6 | NanoActive ® Al₂O₃ | 0.79 | 0 | 0.60 |
| 7 | NanoActive ® TiO₂-12/NanoActive ® MgO mixture | 0.87 | 0 | 1.04 |
| 8 | NanoActive ® ZnO | 0.89 | 0 | 3.58 |
| 9 | NanoActive ® MgO | 1.4 | 0 | 0.50 |
| 10 | NanoActive ® Plus Al₂O₃ | 3.2+ | 0 | 9.1 | indicates increase in temperature

Figure 4:
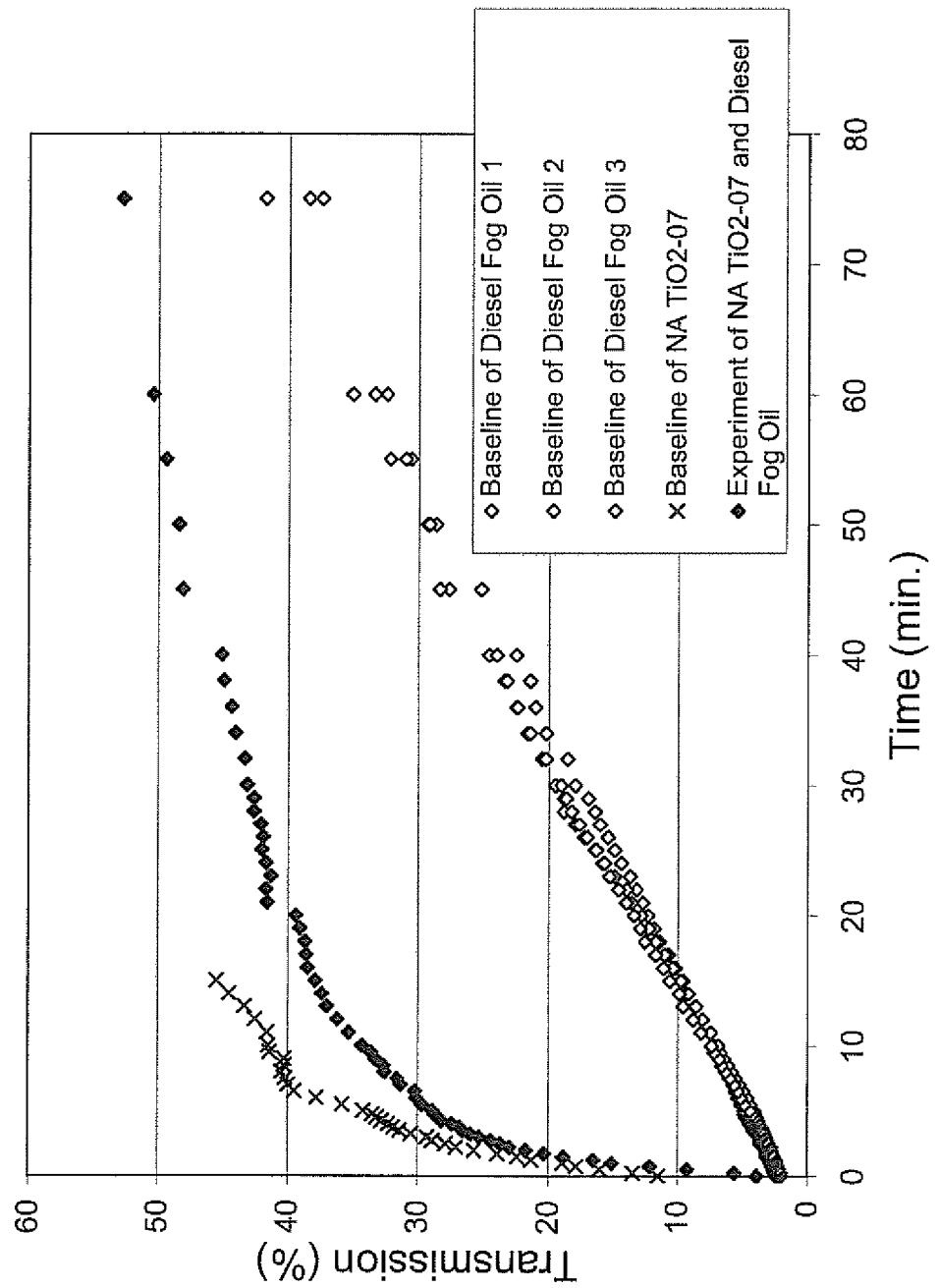
FIG. 4 is a graph showing the reduction of diesel fog smoke using NA $TiO_2$-07.
Figure 5:
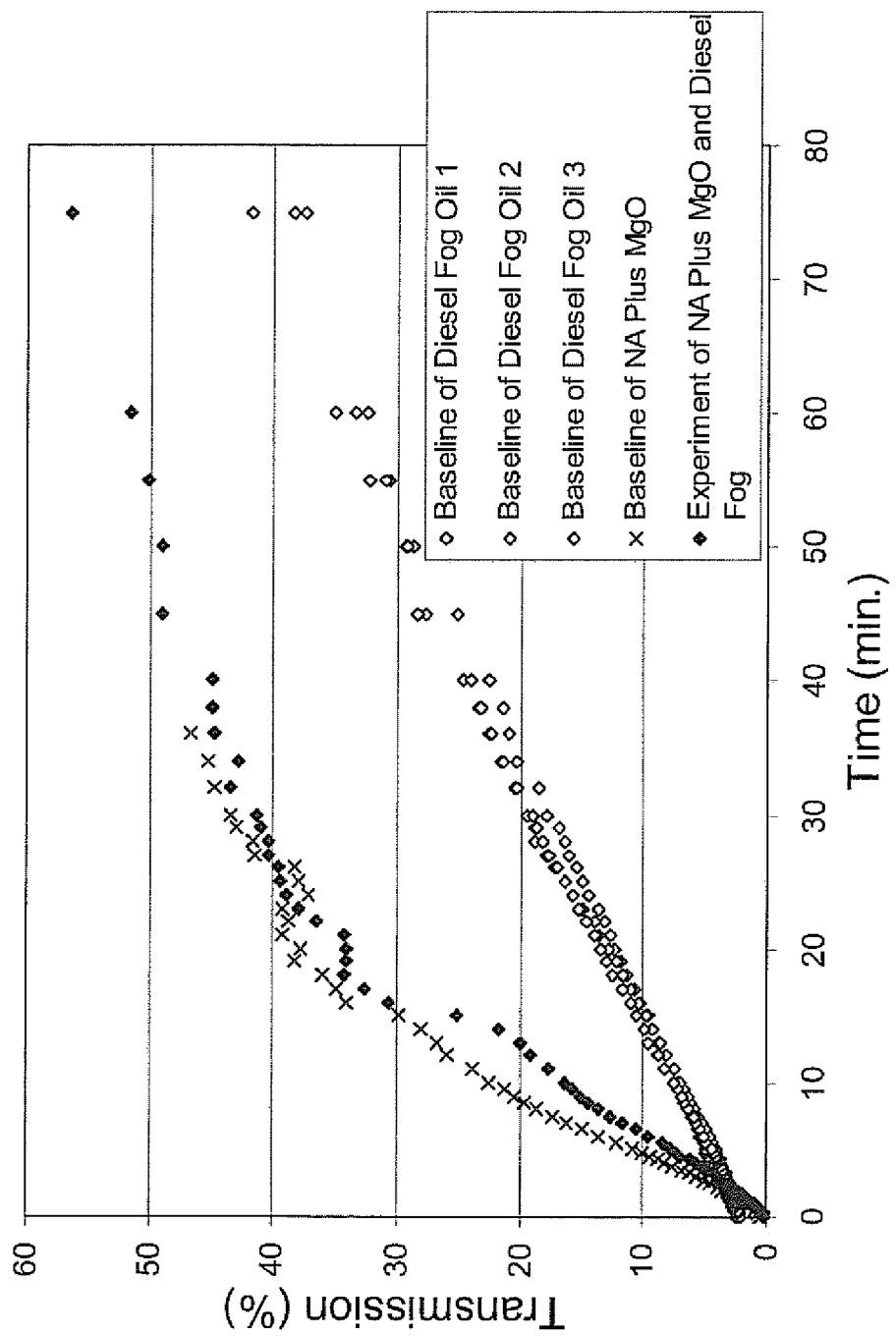
FIG. 5 is a graph showing the reduction of diesel fog smoke using NA MgO Plus.

The best materials for reducing diesel fog smoke were NanoActive® TiO₂-07 and NanoActive® MgO Plus. The NanoActive® TiO₂-07 (FIG. 4) reduced the smoke in a minute. The NanoActive® Plus MgO (FIG. 5) reduced the smoke after approximately nine minutes.

Based on the foregoing experiments, the best-performing materials for theatrical, combustion smoke, and diesel fog were NanoActive® TiO₂-07 and NanoActive® Plus MgO.

While the above experiments were performed using a pressurized cannister to deliver the nanoparticles into the chamber, it is possible to utilize a fluidized-bed delivery system to de-agglomerate nanoparticles and deliver them into the chamber.

Example 3

In this example, a chamber, 0.61 m×0.61 m×1.22 m (2 ft×2 ft×4 ft) in dimension, was constructed and used to test selected reactive nanoparticles ("RNPs"). Particle-size distribution and mass concentration of RNPs and smoke particles were measured using a cascade impactor (Model SE-298K, Thermo Electron Corp.) operated for 30 to 60 sec at the design sampling flow rate of 2 L/min. To minimize sampling losses, the impactor was located inside the chamber. The cascade impactor measures particle mass concentration in the following size ranges: <0.52, 0.52 to 0.93, 1.55 to 3.5, 3.5 to 6.0, 6.0 to 9.8, 9.8 to 14.8, 14.8 to 21.3, and >21.3 μm aerodynamic diameter. Mean aerodynamic geometric mean diameter (GMD) ranged from 4.2 μm (for NanoActive® MgO) to 18.1 μm (for NanoActive® $TiO_2$). The large aerodynamic size compared to the primary size of the RNPs indicates that these RNPs tend to agglomerate.

The same chamber was used to evaluate the effectiveness of RNPs and other agents in removing glycol smoke. Transmission of visible light through the chamber was measured with a transmissometer, which has a spectral response from 400 to 700 nm. In general, opacity through the smoke-filled chamber was reduced after deployment of RNP into the chamber. As a measure of the effectiveness of an agent to improve light transmission or reduce opacity through the chamber, the following parameters were considered:

$$t^*_{80} = \frac{timetoreach 80\%\ opacityforsmokeandagent}{timetoreach 80\%\ opacityforsmokealone} \quad (1)$$

$$t^*_{90} = \frac{\text{time to reach 90\% opacity for smoke and agent}}{\text{time to reach 90\% opacity for smoke alone}} \quad (2)$$

Low values of $t^*_{90}$ and $t^*_{80}$ (i.e., <<1.0) indicate effective smoke reduction; high values (e.g., >1), on the other hand, indicate effective obscuration in the visible wavelength. Table 6 summarizes the calculated $t^*_{90}$ and $t^*_{80}$ values for the different RNPs and other smoke-reducing agents or methods of smoke-reduction. NanoActive® $TiO_2$ (both $TiO_2$-07 and -12) and MgO Plus were generally the most effective in improving light transmission through the chamber. Of the RNPs tested, NanoActive® MgO and jet-milled $Al_2O_3$ Plus were the least effective. In fact, both of these RNPs served as obscurants. Jet milled particles were created by physically modifying NanoActive® materials by passing them through a jet mill to obtain a deagglomerated state with uniform particle size distribution. The other commercially available powders (other than the RNPs) that were evaluated include those described in Table 5.

TABLE 5

Specifications of other smoke-reducing agents

| Material | Product No. | Specifications | Source |
|---|---|---|---|
| $NaHCO_3$ | FA 5G | Dry chemical fire extinguisher | Walter Kidde |
| Powder-activated carbon (PAC) | — | — | Merck |
| Cornstarch | — | Cornstarch-based baby powder | Equate |
| S-A $TiO_2$ | 22,422-7 | <5 μm, 99.9+% | Sigma-Aldrich (S-A) |
| S-A MgO | 34,279-3 | <325 mesh, 99+% | Sigma-Aldrich (S-A) |
| S-A $CaCO_3$ | 31,003-4 | Limestone, 10 μm, 98% | Sigma-Aldrich (S-A) |
| S-A $Ca(OH)_2$ | 23,923-2 | Hydrated lime, 95+% | Sigma-Aldrich (S-A) |
| Natural calcite | — | Milled, natural bulk Iceland Spar calcite | Ward's Natural Science |

TABLE 6

Effectiveness of smoke-reducing agents (when deployed at 80 psi) in improving light transmission through the chamber. Agents or methods are listed in the order of decreasing effectiveness based on the $t^*_{90}$ value.

| Smoke-Reducing Agent | Mean Mass Concentration[1] g/m³ | $t^*_{90}$ Rep 1 | $t^*_{90}$ Rep 2 | $t^*_{90}$ Rep 3 | $t^*_{90}$ Mean | $t^*_{80}$ Rep 1 | $t^*_{80}$ Rep 2 | $t^*_{80}$ Rep 3 | $t^*_{80}$ Mean |
|---|---|---|---|---|---|---|---|---|---|
| NanoActive ® $TiO_2$-07 | 3.4 | 0.11 | 0.07 | 0.41 | 0.20 | 0.34 | 0.16 | 0.52 | 0.34 |
| NanoActive ® MgO Plus | 6.7 | 0.20 | 0.24 | — | 0.22 | 0.24 | 0.29 | — | 0.27 |
| NanoActive ® $TiO_2$-12 | 4.5 | 0.27 | 0.30 | 0.34 | 0.30 | 0.25 | 0.33 | 0.38 | 0.32 |
| $NaHCO_3$ | 3.3 | 0.37 | 0.29 | — | 0.33 | 0.49 | 0.41 | — | 0.45 |
| Sigma-Aldrich $Ca(OH)_2$ | 7.6 | 0.54 | 0.48 | — | 0.51 | 0.53 | 0.50 | — | 0.52 |
| NanoActive ® $Al_2O_3$ Plus | 3.6 | 0.50 | 0.53 | — | 0.52 | 0.64 | 0.53 | — | 0.59 |
| Sigma-Aldrich $CaCO_3$ | 3.9 | 0.61 | 0.60 | — | 0.61 | 0.71 | 0.70 | — | 0.71 |
| Enhanced air mixing | — | 0.46 | 0.87 | 0.50 | 0.61 | 0.48 | 1.00 | 0.28 | 0.59 |
| Natural Calcite | 3.2 | 0.72 | 0.61 | — | 0.67 | 0.83 | 0.70 | — | 0.77 |

TABLE 6-continued

Effectiveness of smoke-reducing agents (when deployed at 80 psi) in improving light transmission through the chamber. Agents or methods are listed in the order of decreasing effectiveness based on the $t^*_{90}$ value.

| Smoke-Reducing Agent | Mean Mass Concentration[1] g/m³ | $t^*_{90}$ Rep 1 | Rep 2 | Rep 3 | Mean | $t^*_{80}$ Rep 1 | Rep 2 | Rep 3 | Mean |
|---|---|---|---|---|---|---|---|---|---|
| Sigma-Aldrich TiO₂ | 2.0 | 0.53 | 0.88 | 0.72 | 0.71 | 0.54 | 0.93 | 0.77 | 0.75 |
| NanoActive ® TiO₂ jet-milled | 3.2 | 0.76 | 0.67 | — | 0.72 | 0.69 | 0.75 | — | 0.72 |
| Corn starch | 4.3 | 0.76 | 0.80 | — | 0.78 | 0.74 | 0.78 | — | 0.76 |
| NanoActive ® Al₂O₃ | 3.3 | 0.78 | 0.64 | 1.05 | 0.82 | 0.88 | 0.71 | 0.88 | 0.82 |
| Sigma-Aldrich MgO | 2.4 | 1.28 | 1.02 | 0.94 | 1.08 | 1.39 | 1.03 | 0.98 | 1.13 |
| NanoActive ® MgO | 3.5 | 1.06 | 1.23 | — | 1.15 | 1.10 | 1.26 | — | 1.18 |
| NanoActive ® Al₂O₃ Plus-jet-milled | 2.4 | 1.22 | 1.18 | — | 1.20 | 1.49 | 1.24 | — | 1.37 |
| Merck powder-activated carbon | 2.1 | 4.00 | — | — | 4.00 | 4.11 | — | — | 4.11 |

[1]Mass concentration of particles dispersed in the chamber was measured using an 8-stage cascade impactor during the first 30 to 60 sec after deployment.

As previously mentioned, the RNPs tend to have large aerodynamic diameters after deployment into the chamber, indicating that they tend to agglomerate. It was postulated that to be effective smoke-reducing agents, the following conditions should be achieved: (1) RNPs should be able to adsorb, absorb, or react chemically with smoke constituents; (2) they should be present in significant amounts because the interaction between the deployed RNPs and smoke particles largely depends on collisions; and (3) the agglomerates should be large enough so that they will settle out rapidly—if they are too small or as large as the smoke particles, they will not settle out rapidly and serve as obscurants; if they are too large, larger amounts of RNPs will be needed to achieve effective collision and interaction with the smoke particles.

Figures 6, 7:
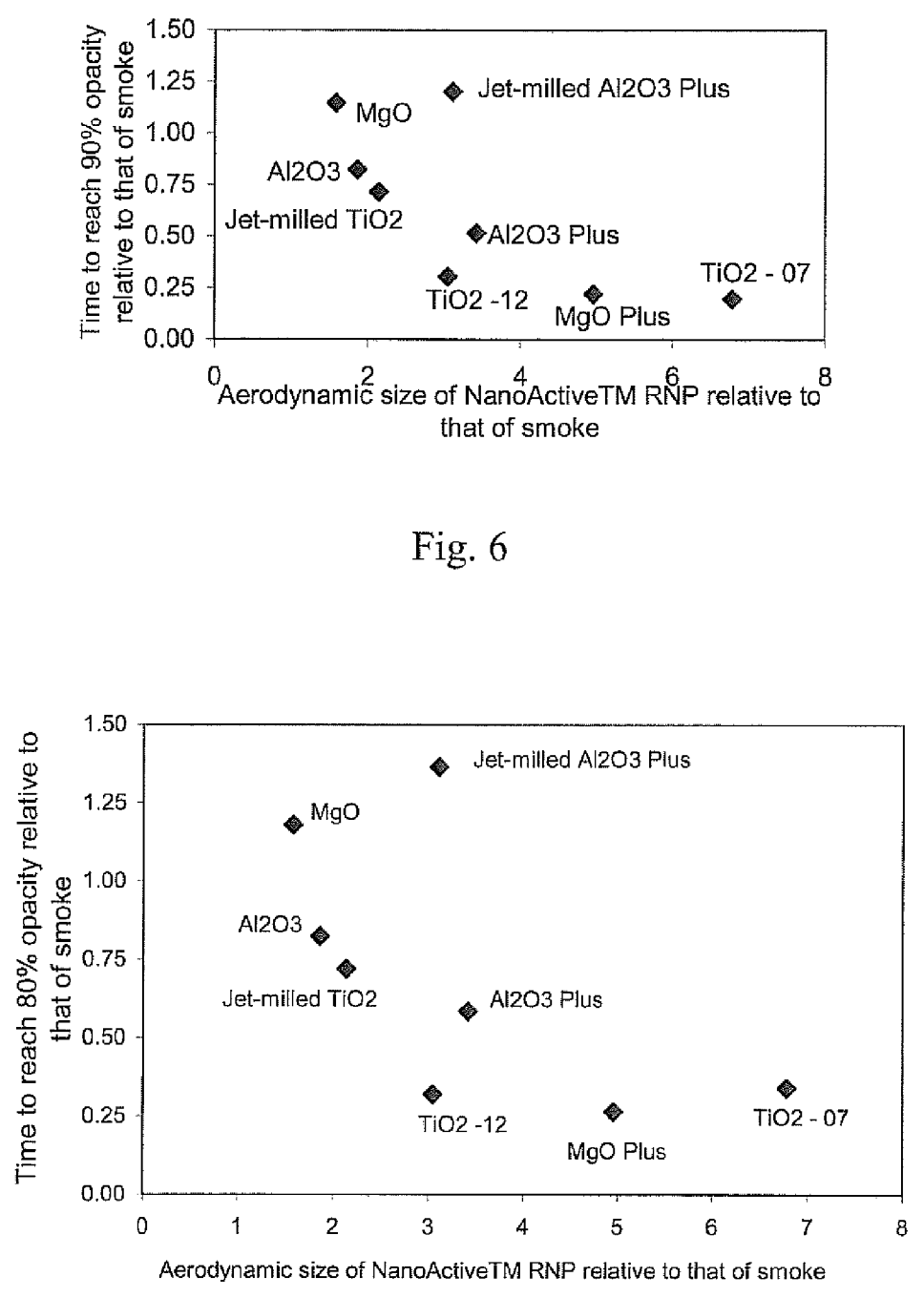

FIGS. 6 and 7 relate, respectively, the $t^*_{90}$ and $t^*_{80}$ values to the aerodynamic size of the RNPs relative to the glycol smoke. Results suggest that larger RNP agglomerates (i.e., NanoActive® TiO₂ and MgO Plus) tend to be more effective smoke-reducing agents than the smaller RNP agglomerates (i.e., NanoActive® MgO). Note that the size distribution of RNPs will change with time as a result of collisions and sedimentation; the aerodynamic size used here is the geometric mean diameter within the first 30 to 60 seconds after deployment of the RNP into the chamber.

Example 4

Figure 8:
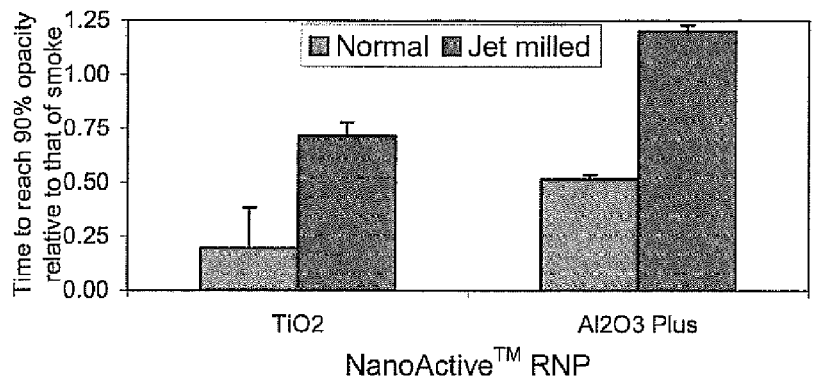
FIG. 8 is a graph comparing the smoke-clearing effectiveness of jet-milled and "normal" RNPs.

The effect of particle size can also be seen by comparing the jet-milled and "normal" RNPs; these materials are similar in terms of reactivity except for their size. In general, the jet-milled RNPs, which were smaller aerodynamically and physically compared to the "normal" RNPs, were less effective than their corresponding "normal" RNPs (FIG. 8).

Example 5

Figure 9:
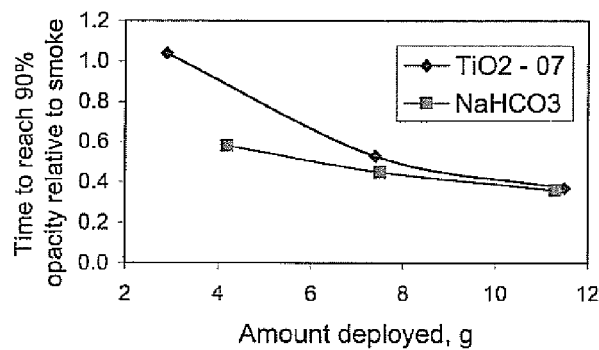
FIG. 9 is a graph showing smoke-clearing effectiveness as affected by the amount of material deployed.

In this Example, the effect of the amount of RNP deployed was determined. Reduction of smoke involves collisions of RNPs and smoke particles. Such collisions will be influenced by the (number) concentration of RNP or the amount deployed. Three different amounts of NanoActive® TiO₂-07 were deployed into the smoke-filled chamber and the resulting reduction in opacity was monitored. Varying amounts of dispersed material were achieved by loading different amounts (i.e., 5.0, 10.0, and 15.0 g) of TiO₂-07 into the canister and discharging the entire contents into the chamber at 80 psi pressure. The actual amounts of dispersed material were measured as 2.9, 7.4, and 11.5 g, respectively. The corresponding mass concentrations measured, using a 37-mm filter sampler located outside the chamber, were 2.2, 2.5, and 2.4 g/m³, respectively. As expected, increasing the amount of TiO₂-07 deployed resulted in faster rate of smoke reduction (FIG. 9). Comparative data using sodium bicarbonate is also shown and illustrates little change in effectiveness as the amount deployed increased.

Example 6

In this example, the effects of the amount of particles deployed on the effectiveness of selected materials in clearing glycol smoke were determined. Experiments were conducted with a small-scale chamber (2 ft×2 ft×4 ft) to determine the effect of the amount of NanoActive® TiO₂-07 and NaHCO₃—FE deployed in clearing glycol smoke. The experiments involved producing smoke using a smoke generator, which heats a glycol/water solution and feeds the vapor through an orifice, introducing particles into the chamber using a pressurized canister, and monitoring light transmission with a transmissometer.

The effectiveness of the material in clearing smoke was expressed in terms of the $t^*_{10}$ and $t^*_{20}$ values. These values correspond to the times to reach 10% and 20% light transmission, respectively, relative to the natural clearing of smoke. Lower values of $t^*_{10}$ and $t^*_{20}$ indicate better smoke-clearing. The results suggest that increasing the amount of particles deployed (for NanoActive® TiO₂-07 and NaHCO₃—FE) tended to enhance the clearing effectiveness of the particles for glycol smoke.

Figure 10:
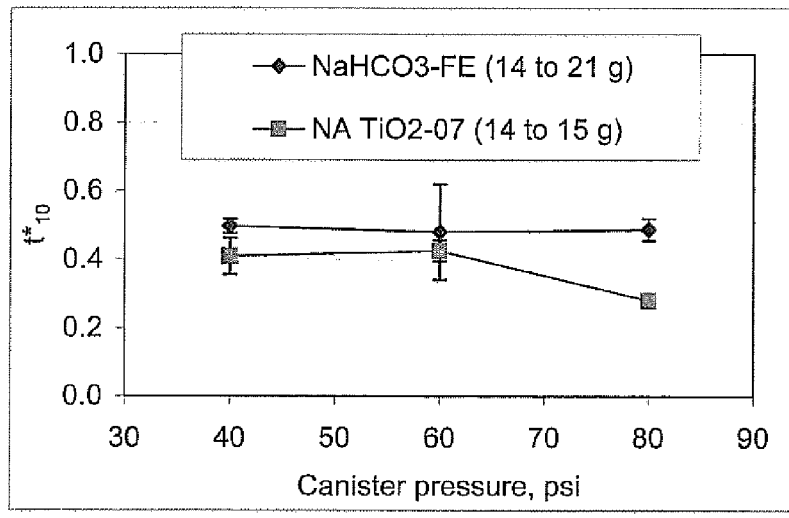
FIG. 10 is a graph of the effect of delivery pressure on the effectiveness of NA $TiO_2$-07 and $NaHCO_3$—FE in clearing glycol smoke.

Experiments were also conducted to determine the effects of delivery pressure on the effectiveness of NanoActive® TiO₂-07 and NaHCO₃—FE in clearing glycol smoke using the chamber. Particles were deployed into the chamber using a canister pressurized to 40, 60, or 80 psi. For NaHCO₃—FE with deployed amounts of 14 to 21 g, delivery pressure (from 40 to 80 psi) had limited influence on its effectiveness in clearing glycol smoke. For NanoActive® TiO$_2$-07 with deployed amounts of 14 to 15 g, on the other hand, increasing the delivery pressure from 40 to 80 psi tended to enhance the clearing effectiveness for glycol smoke (FIG. 10).

Example 7

In this example, the effect of mass concentration of NanoActive® material on smoke-clearing effectiveness was tested using a pressurized-column delivery system. The pressurized column was chosen due to certain clean out problems of the materials with the pressurized canister. As shown in Table 7, the expected concentration in the chamber was 32 g/m$^3$ if the material was completely discharged when a pressurized canister was loaded with 10 g of material. Comparing the clean out data of all the materials listed in Table 7, NanoActive® TiO$_2$-07 and NanoActive® MgO Plus were in the range of 24-26 g/m$^3$ and NanoActive® TiO$_2$-12 and NanoActive® MgO were delivered between 8-10 g/m$^3$. Since there was huge discrepancy in the cleanout of each material, it was decided to use a pressurized column so that known amounts of material could be deployed into the chamber. The mass concentration delivered into the chamber for four different particle size ranges (250-425 μm, 180-250 μm, 150-180 μm, 125-150 μm) of granulated NanoActive® TiO$_2$-12 and NanoActive® MgO is also shown in Table 7. The results indicated that higher amounts of granulated material were delivered into the chamber compared to the powder form of the same material.

efficiency decreased for NanoActive® TiO$_2$-12 and NanoActive® MgO Plus when mass increased. NanoActive® TiO$_2$-12 had a better smoke-clearing effectiveness with 1 g than at 5 g with respect to t*$_5$ values. Given the fact that the aerodynamic diameter of the NanoActive® TiO$_2$-12 is smaller (geometric mean diameter, GMD: 8.1 μm) than that of NanoActive® TiO$_2$-07 (GMD: 18.1 μm), this also shows that aerodynamic particle-size distribution can play an important factor in clearing the smoke. Hence the method of delivery, aerodynamic diameter and the amount of materials delivered into chamber have a significant effect on smoke reduction.

Example 8

In this example, the effect of aerodynamic diameter of the NanoActive® materials being delivered into the small chamber on smoke-clearing effectiveness was examined. As shown in FIGS. 12-15, particles of the NanoActive® TiO$_2$-07 and NanoActive® MgO Plus had the larger particle-size distributions ranging from about 3.5 to 15 μm; NanoActive® TiO$_2$-12 had the smaller particle size distribution ranging from about 0.9 to 3.5 μm; and NanoActive® MgO had the most uniform particle-size distribution ranging from as small as 0.25 μm to as large as 21 μm. It is theorized that the discrepancies of the smoke-clearing efficiency between NanoActive® TiO$_2$-07 and NanoActive® TiO$_2$-12 is due at least in part to the significant differences in particle-size distribution.

Thus, materials with smaller particle size distributions may have slower settling velocities which causes the material to be

TABLE 7

Mass-per-cubic meter delivered of powder and different sizes of the granulated NanoActive ® materials using pressurized canister.

| | Mass of Material Delivered into Chamber (g/m$^3$) | | | | |
|---|---|---|---|---|---|
| Charged amount: 10 g<br>NanoActive ® Material | Powder | Granules<br>425 > x > 250<br>(μm) | Granules<br>250 > x > 180<br>(μm) | Granules<br>180 > x > 150<br>(μm) | Granules<br>150 > x > 125<br>(μm) |
| NanoActive ® TiO$_2$-07 | 24.7 ± 1.3 | — | — | — | — |
| NanoActive ® TiO$_2$-12 | 8.4 ± 2.7 | 15.6 ± 4.9 | 14.5 ± 0.8 | 15.7 ± 1.7 | 18.0 ± 2.2 |
| NanoActive ® MgO | 10.31 ± 0.0 | 17.4 ± 2.7 | 15.7 ± 2.9 | 15.2 ± 2.3 | 13.8 ± 5.8 |
| NanoActive ® MgO Plus | 26.3 ± 0.4 | — | — | — | — |

The experiments to determine the effect of concentration on combustion smoke-reduction were carried out with NanoActive® TiO$_2$-07, NanoActive® MgO Plus, and NanoActive® TiO$_2$-12 in duplicate at masses of 1, 5, 10, and 20 grams. The pressurized-column system helps to deliver a known amount of materials into the small chamber (2.25 ft×2.25 ft×2.33 ft, volume: 11.7 ft$^3$ or 0.32 m$^3$). The materials were delivered into the chamber through the pressurized column using nitrogen gas at 80 psi, which pushes the material through the tube into the chamber. The smoke-reduction efficiency was calculated based on the following equation, with a t* less than 1 indicating smoke reduction.

$$t_x^* = \frac{\left(\begin{array}{c}\text{time taken for smoke and clearing}\\ \text{material to reach } x \text{ \% transmission}\end{array}\right)}{\left(\begin{array}{c}\text{time taken for smoke on its}\\ \text{own to reach } x \text{ \% transmission}\end{array}\right)}$$

Figure 11:
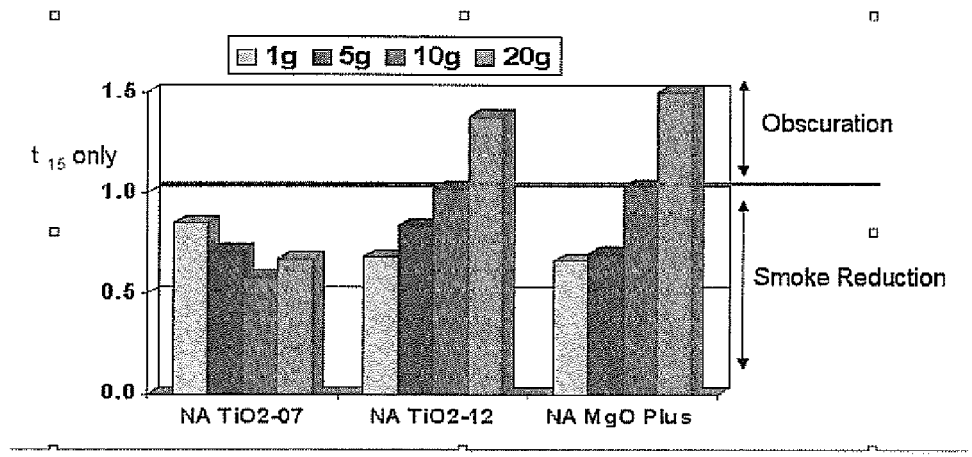
FIG. 11 is a chart comparing the smoke-clearing effects for various nanomaterials at several mass concentrations.
Figure 12:
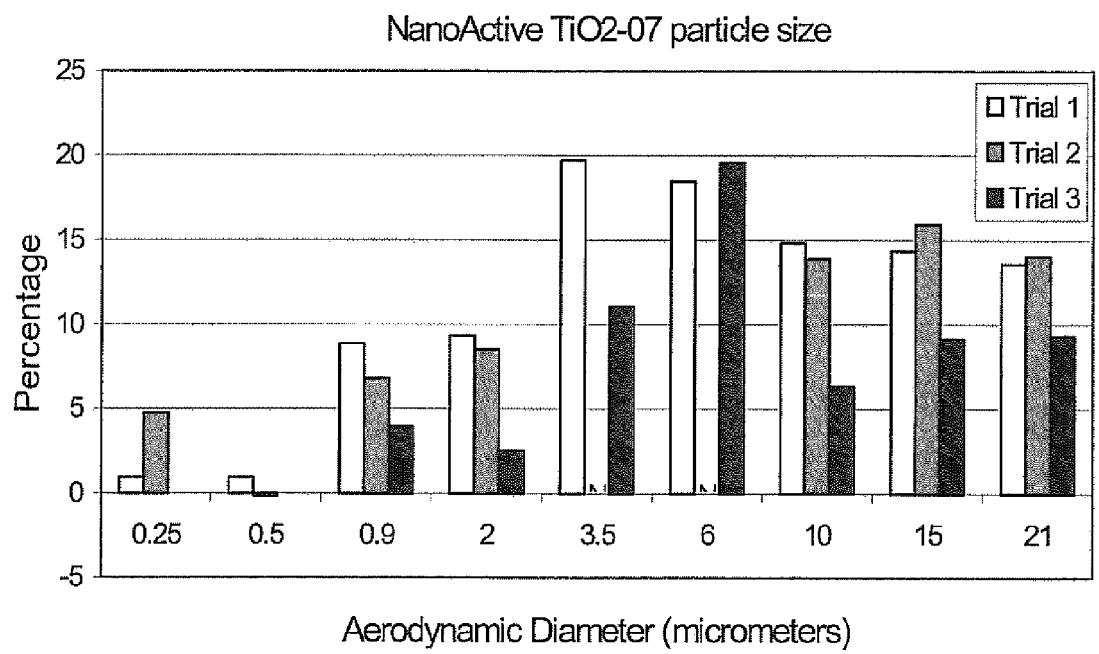
FIG. 12 is a chart depicting the relative distribution of the aerodynamic diameters of NA $TiO_2$-07.
Figure 13:
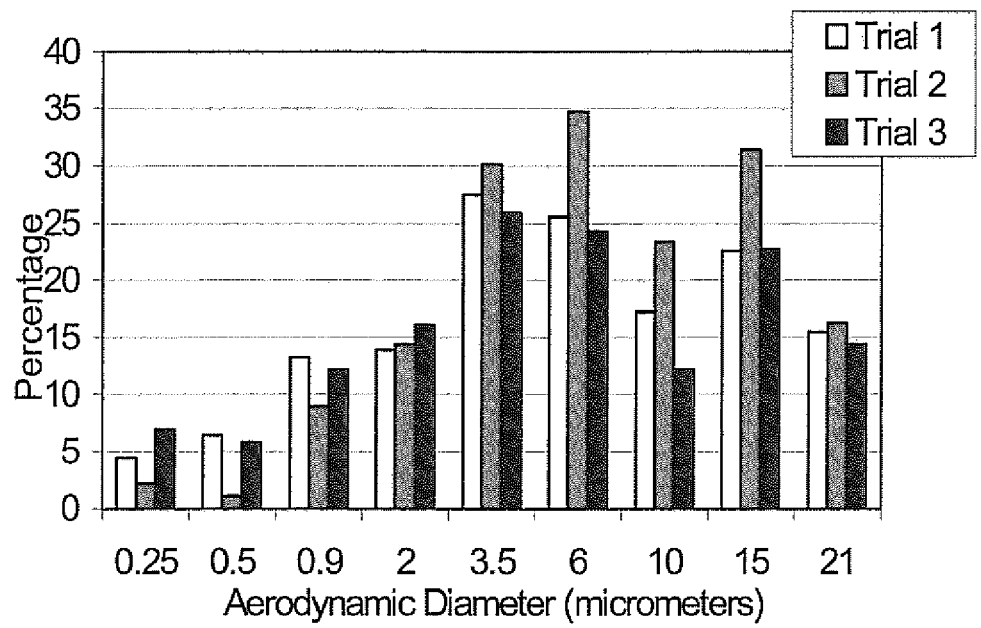
FIG. 13 is a chart depicting the relative distribution of the aerodynamic diameters of NA MgO Plus.
Figure 14:
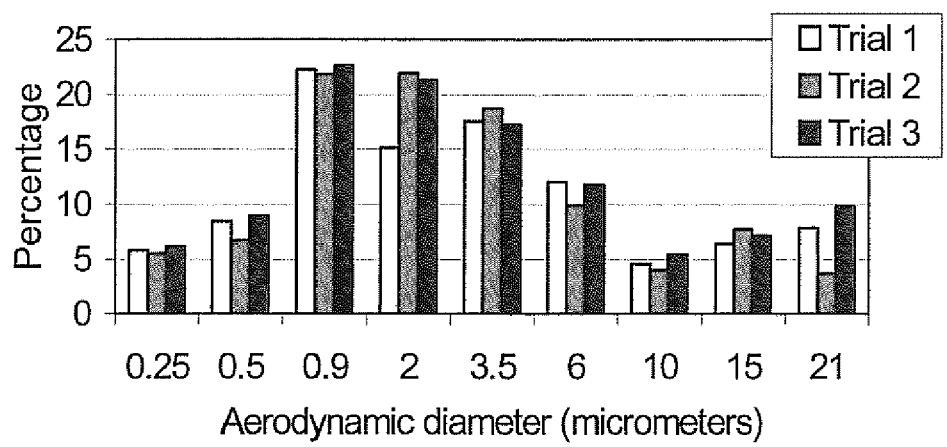
FIG. 14 is a chart depicting the relative distribution of the aerodynamic diameters of NA $TiO_2$-12.
Figure 15:
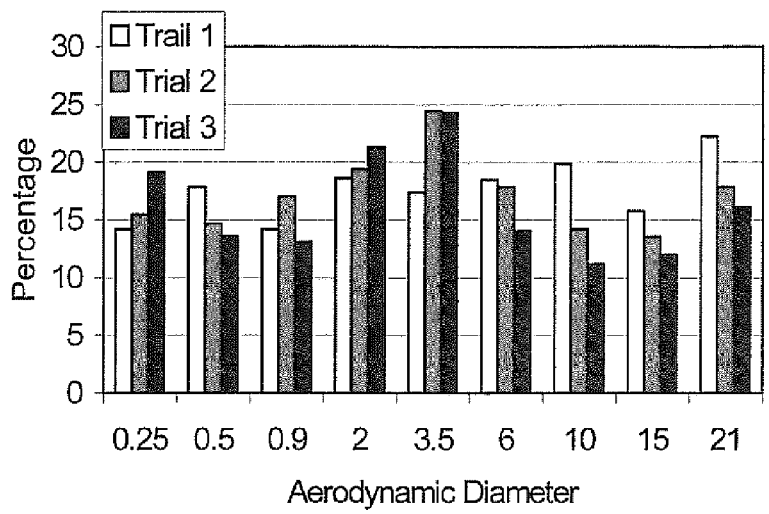
FIG. 15 is a chart depicting the relative distribution of the aerodynamic diameters of NA MgO.

FIG. 11 highlights the fact that as a function of mass, the combustion smoke-reduction effectiveness increases as mass increases for NanoActive® TiO$_2$-07, whereas the reduction suspended longer, and the materials with larger particle size distributions may have faster settling velocities and clear the smoke more rapidly.

Example 9

In this example, the correlation between settling velocity and calculated aerodynamic diameter was examined. Particle-size distributions for nine NanoActive® materials were obtained experimentally using a particle-size analyzer (Mastersizer 2000 coupled with Scirocco 2000, both manufactured by Malvern Instruments). In all cases, a dry powder sample was dispersed in air. The particle-size distributions differed significantly among the various NanoActive® materials.

Figure 16:
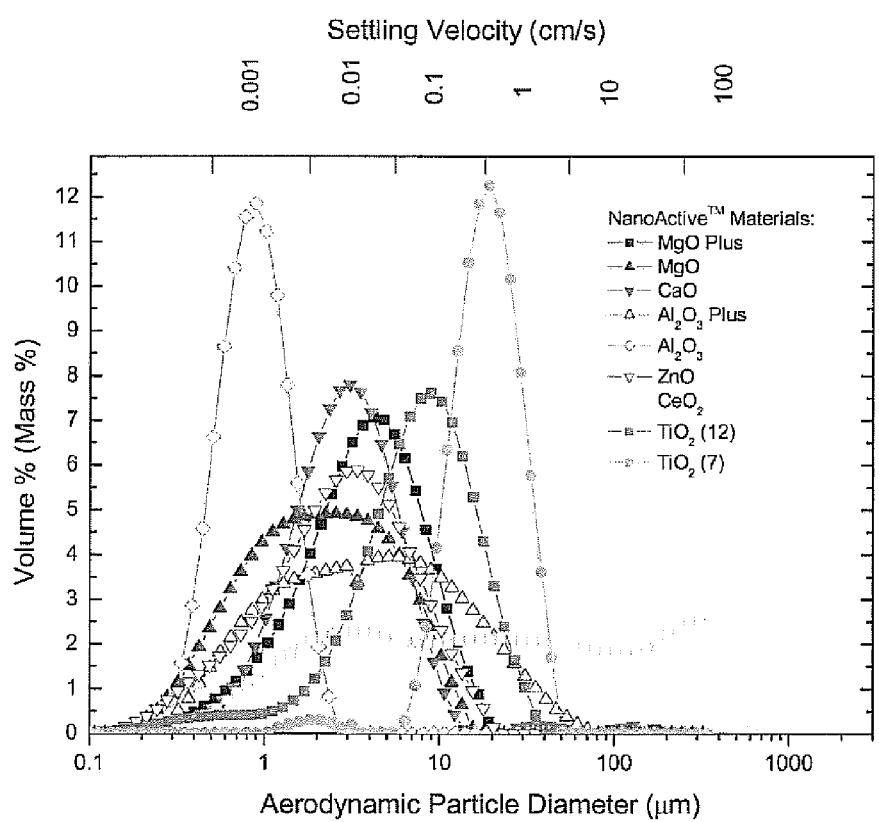
FIG. 16 is a graph comparing calculated aerodynamic particle sizes and settling velocity for various nanomaterials.

The particle-size distributions were used to obtain aerodynamic size distributions using an approximation valid for small spherical particles in a Stokes regime (C. D. Cooper and F. C. Alley, Air Pollution Control—A Design Approach, 2$^{nd}$ ed. Prospect Heights, Ill.: Waveland Press, Inc., 1994).

$$d_A = d_p \sqrt{\rho_p}$$

where d$_A$ is an aerodynamic diameter, d$_p$ is a particle diameter, and ρ$_p$ is a particle density expressed in g/cm$^3$. In the above approximation, the particle density was assumed to be equal to the apparent powder density that can be easily measured. FIG. 16 shows the calculated aerodynamic particle-size distributions and settling velocities (top horizontal axis) for nine NanoActive® metal oxides.

Calculated settling velocities varied widely for the NanoActive® materials ranging from 0.001-0.01 cm/s (NanoActive® $Al_2O_3$) to 10-100 cm/s (part of the particle distribution for NanoActive® $CeO_2$). There appear to be a correlation between the settling velocity and the smoke-clearing capability of various formulations. Experiments conducted in the small chamber indicated that the material exhibiting the best smoke-clearing capability was NanoActive® $TiO_2$-07, followed by NanoActive® MgO Plus and NanoActive® $TiO_2$-12. NanoActive® MgO, was not found to effectively clear smoke, but instead provided obscuration. A similar trend was observed for the settling velocity. The best smoke-clearing formulation, NanoActive® $TiO_2$-07, had almost probable settling velocity close to 1 cm/s, the highest value for all tested oxides. Two formulations with moderate smoke-clearing capacity, NanoActive® MgO Plus and NanoActive® $TiO_2$-12, had probable settling velocities in the 0.07-0.3 cm/s range. The least effective smoke-clearing material tested, NanoActive® MgO, had the smallest average settling velocity of 0.01 cm/s. This data suggests that formulations having a relatively narrow particle-size distribution with a probably particle diameter between 10-30 μm would have the best smoke-clearing capabilities. Aerodynamic diameter and settling velocity are important for a material to clear combustion smoke.

Example 10

In this example, granules of NanoActive® $TiO_2$-12 and NanoActive® MgO were tested for effectiveness in reducing combustion smoke. Four different sizes of granules were tested: 250-425 μm, 180-250 μm, 150-180 μm, and 125-150 μm. Table 7 showed the different amounts of each granulated NanoActive® material compared with powdered NanoActive® material deployed into the experimental chamber in terms of $g/m^3$. The calculation was performed based on the volume of the chamber, which is 0.32 $m^3$. The mass delivered for all the granule size of both NanoActive® materials was fairly consistent.

The percent (%) transmission change was recorded after delivering NanoActive® materials into the chamber filled with combustion smoke. The granulated NanoActive® $TiO_2$-12 size of 250>x>180 μm had the lowest t* values of the four granulated sizes of NanoActive® $TiO_2$-12. Therefore, it was most effective at reducing smoke. In addition, the granule sizes of 425>x>250 and 250>x>180 μm for the NanoActive® $TiO_2$-12 follow the same pattern $t^*_{10}$-$t^*_{15}$-$t^*_{20}$ as the normal NanoActive® $TiO_2$-07 which indicated rapid smoke reduction in the beginning ($t^*_{10}$) of the experiment. However, the granule sizes of 180>x>150 μm and 150>x>125 μm for the NanoActive® $TiO_2$-12 began to follow the same pattern as the normal NanoActive® $TiO_2$-12 which indicated obscuration in the early stage in the experiment and smoke reduction later in the experiment. The results indicated that granulated NanoActive® $TiO_2$-12, size 425>x>250 μm, performed better than powder NanoActive® $TiO_2$-12.

Example 11

Figure 17:
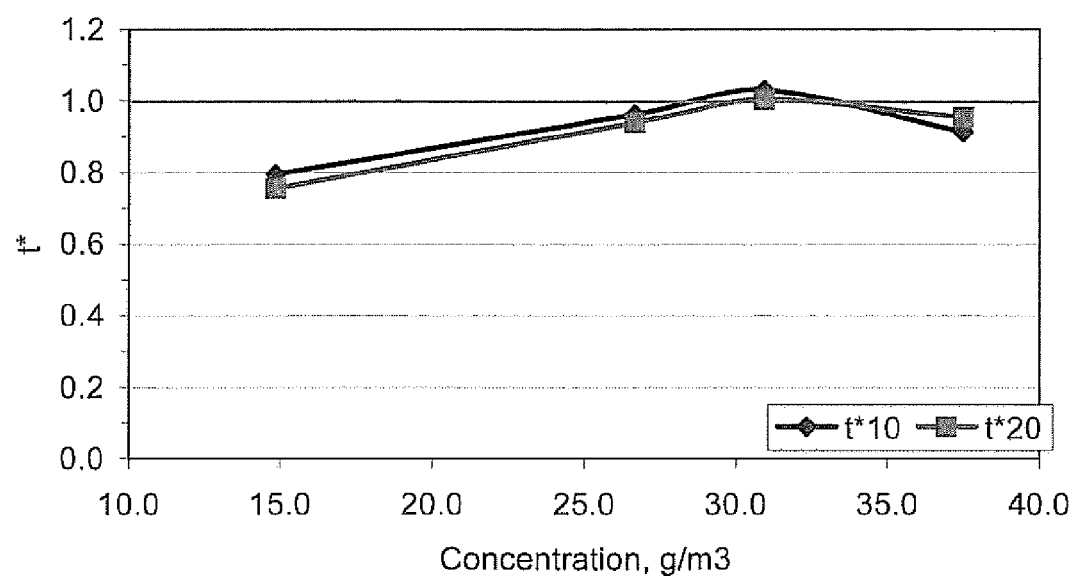
FIG. 17 is a graph comparing the effect of concentration on smoke reduction for NA TiO$_2$-12.

In this example, the effect of higher concentrations of NanoActive® $TiO_2$-12 granules in the range of 250>x>180 μm on smoke-clearing efficiency was examined. The effect of concentration of NanoActive® $TiO_2$-12 granules (size 250>x>180 μm) deployed into the small-scale chamber for combustion smoke reduction was studied by placing different amounts (15, 20, 25, and 30 grams) of material into the canister to achieve different deployed amounts. The resulting concentration of particles inside the chamber was calculated by dividing the amount of material deployed by the volume of the chamber. FIG. 17 displays $t^*_{10}$ and $t^*_{20}$ as a function of concentration.

The t* values obtained using the different amounts of NanoActive®-G $TiO_2$-12 were for the most part very similar, with most of them lying near 0.80 and 1.00. The exception to this can be seen at lower concentrations. The lower concentrations appeared to help smoke reduction while the higher concentrations, seemed to increase obscuration. Data also showed that at low concentrations $t^*_{10}$ was higher than the $t^*_{20}$, meaning that smoke reduction was taking place more rapidly in the beginning. Therefore, a lower concentration may improve smoke reduction faster than higher concentrations of particles.

Example 12

In this example, the effect of pressure in delivering NanoActive® materials for clearing combustion smoke in a chamber was examined. Three different pressures were tested (40, 80, 120 psi) by pressurizing a canister filled with approximately 10 g of the selected NanoActive® material and measuring the mass delivered to the chamber and the smoke-reduction efficiency via t* values. Table 8 shows the different amounts of each NanoActive® material deployed into chamber in terms of $g/m^3$, the calculation was based on the volume of the chamber, which was 0.32 $m^3$. The variance in delivery of each NanoActive® material into chamber was largely due to the material and, to a lesser degree, the delivery pressure.

TABLE 8

Mass-per-cubic meter delivered at different pressures to represent the concentration delivered for each NanoActive ® material.

| NanoActive ® Material | Mass of Material Delivered into Chamber ($g/m^3$) | | |
|---|---|---|---|
| | 40 psi | 80 psi | 120 psi |
| NanoActive ® $TiO_2$-07 | 24.7 ± 1.3 | 26.5 ± 0.2 | 26.9 ± 0.7 |
| NanoActive ® $TiO_2$-12 | 8.4 ± 1.1 | 9.7 ± 1.1 | 13.1 ± 2.4 |
| NanoActive ® MgO Plus | 26.3 ± 0.4 | 27.8 ± 4 | 29.4 ± 0.2 |

Figure 18:
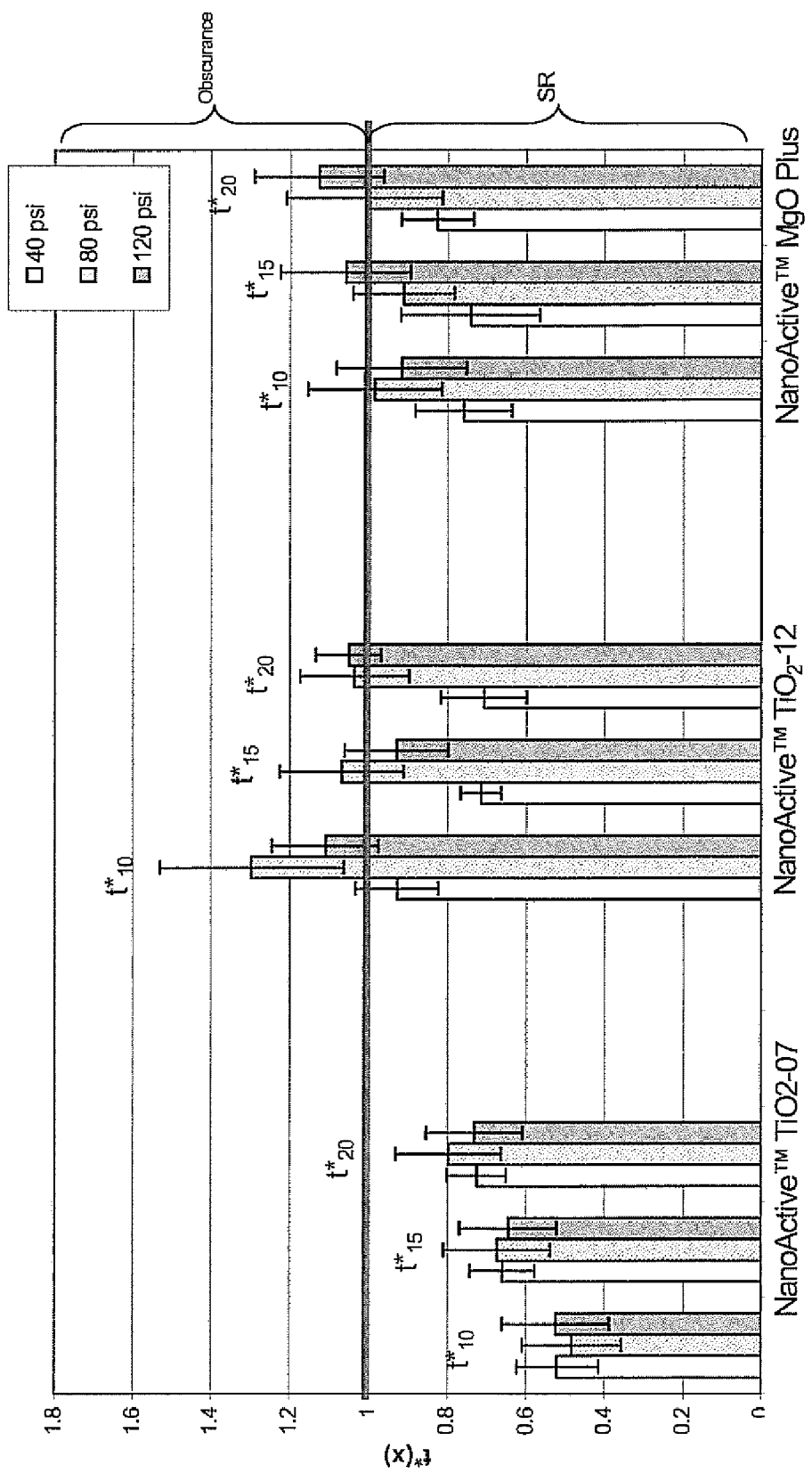
FIG. 18 is a chart comparing the smoke-reduction efficiency for various nanomaterials delivered at different pressures.

The percent transmission change was recorded with respect to time after deploying the NanoActive® materials into the chamber filled with combustion smoke. The combustion smoke-reduction efficiency in terms of t* (at 10, 15, 20 percent transmission) for NanoActive® $TiO_2$-07, NanoActive® $TiO_2$-12, and NanoActive® MgO Plus are presented in FIG. 18.

All three materials studied reduced combustion smoke at a delivery pressure of 40 psi. While at the other two pressures (80 and 120 psi), NanoActive® $TiO_2$-12 and NanoActive® MgO Plus did not reduce smoke but created obscuration. The smoke-reducing capabilities of NanoActive® $TiO_2$-07 were not as affected by delivery pressure as the NanoActive® $TiO_2$-12 and NanoActive® MgO Plus.

Example 13

In this example, the effect of using a pressurizing gas in delivering NanoActive® materials for clearing combustion smoke in a chamber was examined. Three gases ($N_2$, He, and Ar) were studied by pressurizing a canister filled with approximately 10 g of the selected NanoActive® material and measuring the mass delivered to the chamber and the smoke-reduction efficiency via t*. Table 9 displays the different amounts of each NanoActive® material deployed into chamber in terms of g/m³; the calculation was based on the volume of the chamber, which was 0.32 m³. The variance of the delivery of each NanoActive® material into the chamber was largely due to the material and, to a lesser degree, the delivery gas.

TABLE 9

Mass-per-cubic meter delivered using different delivery gases for each NanoActive ® material.

| NanoActive ® material | Mass of material delivered into the chamber (g/m³) | | |
|---|---|---|---|
| | helium | nitrogen | Argon |
| NanoActive ® TiO₂-07 | 27.0 ± 1.5 | 24.7 ± 1.3 | 25.2 ± 1.1 |
| NanoActive ® TiO₂-12 | 10.6 ± 2.2 | 8.4 ± 2.7 | 9.7 ± 2.2 |
| NanoActive ® MgO Plus | 28.8 ± 0.0 | 26.3 ± 0.4 | 27.2 ± 0.9 |

Figure 19:
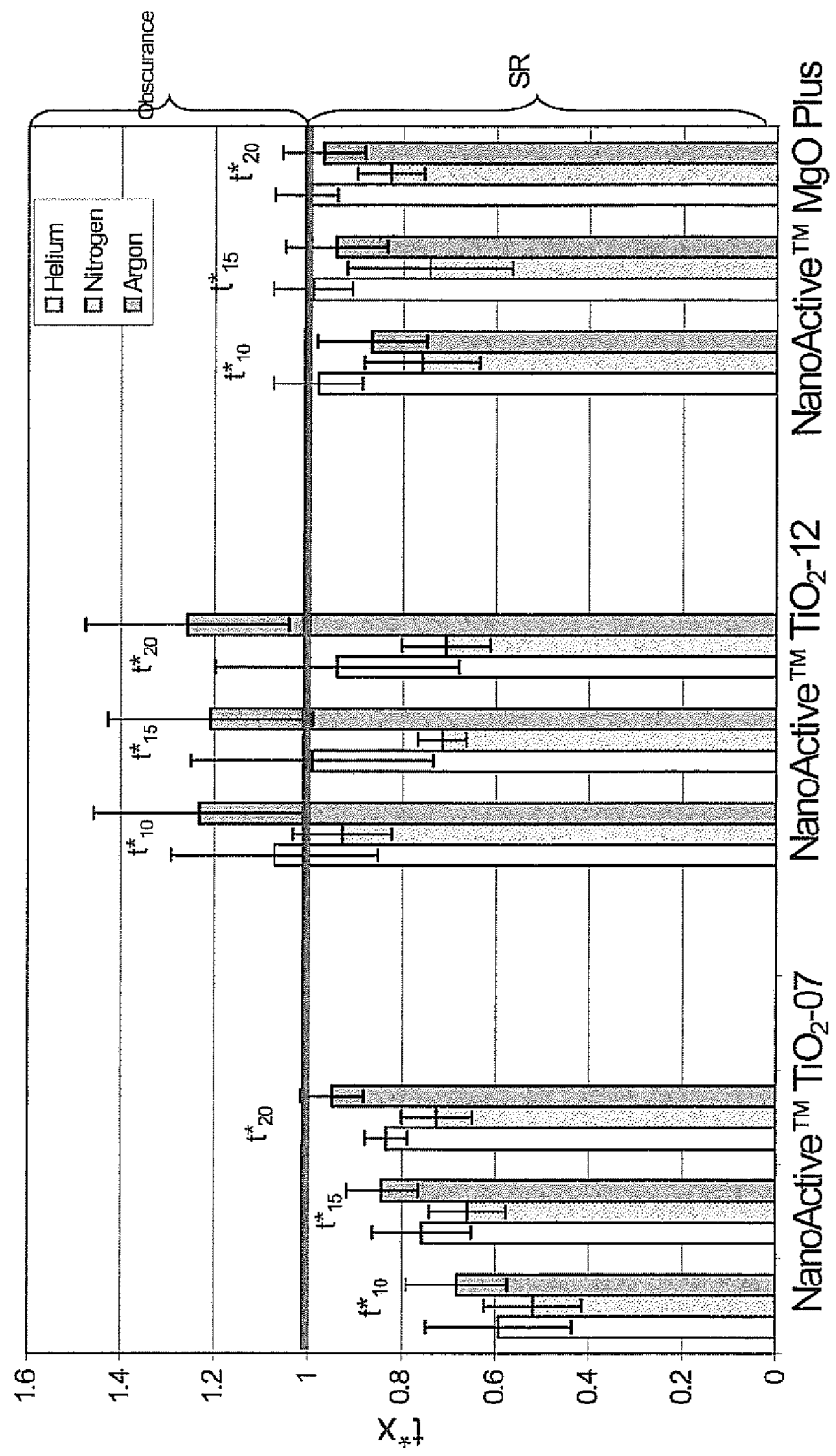
FIG. 19 is a chart comparing the smoke-reduction efficiency for various nanomaterials being delivered with different delivery gases.

The percent transmission change was recorded with respect to time after deploying the NanoActive® materials into the chamber filled with combustion smoke. The combustion smoke-reduction efficiency in terms of t* (at 10, 15, and 20 percent transmission) for NanoActive® TiO₂-07, NanoActive® TiO₂-12, and NanoActive® MgO Plus are presented in FIG. 19.

All three materials studied reduced combustion smoke when nitrogen gas was used. When argon was used, NanoActive® TiO₂-12 did not reduce smoke but created obscuration. Overall, the smoke reducing capabilities of the NanoActive® TiO₂-07 and NanoActive® MgO Plus were not as affected by delivery gas as NanoActive® TiO₂-12.

Example 14

In this example, the smoke-clearing effectiveness of several materials were tested using a room-scale chamber. A room-scale chamber, measuring 8 ft×8 ft×12 ft, was constructed and instrumented with various particle-measuring instruments (i.e., 8-stage cascade impactors, transmissometer, fiber-optic spectrometer, tapered element oscillating microbalance, optical particle counter, gravimetric filter samplers, and particle deposition plates). Experimental protocols were first developed and preliminary studies were conducted with the room-scale chamber. The experiments involved the following steps: (a) introduction of the glycol or diesel/fog-oil smoke into the chamber using a smoke generator, which heats glycol/water solution and/or diesel oil and feeds the vapor through an orifice; (b) deployment of the particles into the chamber using a pressurized canister as soon as the opacity of 100% or light transmission of 0% was reached; and (c) monitoring of light transmission and particulate mass concentration. The following instruments were used: (a) transmissometer for measuring the transmission of visible light through the room-scale chamber (path length of 12 ft), (b) filter samplers for measuring the airborne particulate mass concentration, and (c) tapered element oscillating microbalance (TEOM) for measuring the airborne particulate mass concentration in real-time. Similar to the small-scale chamber studies, the smoke-clearing effectiveness of a material was expressed in terms of $t^*_{10}$ and $t^*_{20}$.

Figure 20:
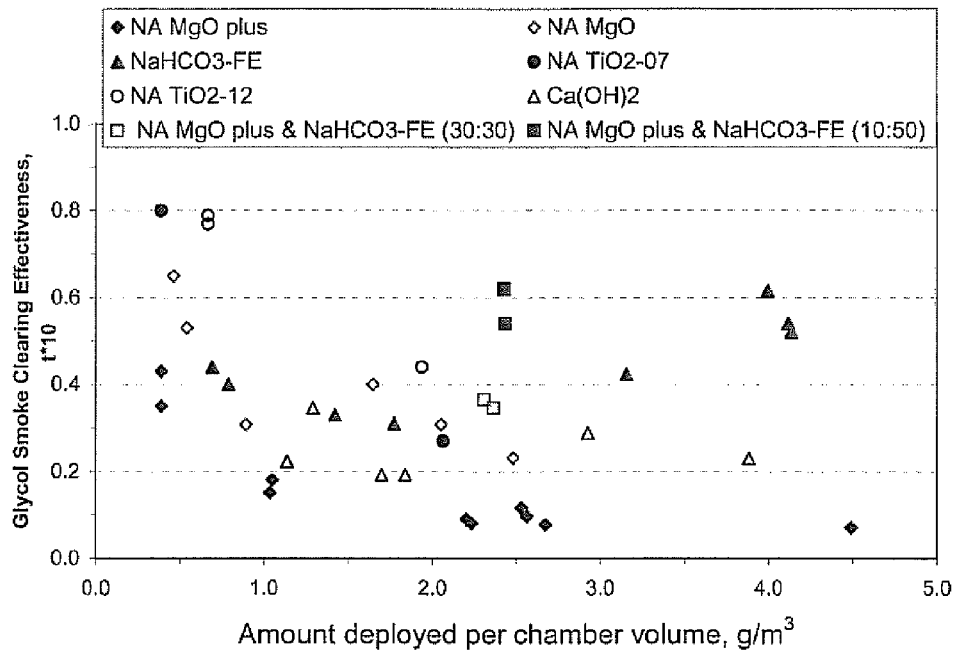
FIG. 20 is a plot of the glycol smoke-clearing effectiveness for different nanomaterials as affected by the amount deployed.
Figure 21:
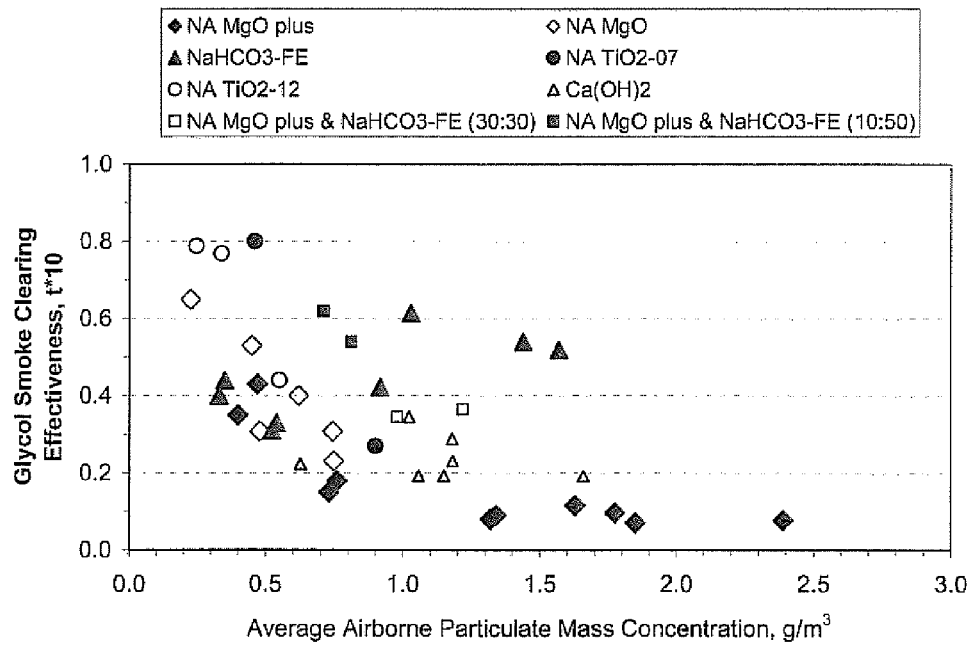
FIG. 21 is a plot of the glycol smoke-clearing effectiveness for different nanomaterials as affected by the airborne particulate mass concentration.

The effectiveness of various materials (i.e., NanoActive® MgO plus, NA TiO₂-07, NA TiO₂-12, NA MgO, NaHCO₃—FE, Ca(OH)₂) in clearing glycol smoke was evaluated in the room-scale chamber following the established protocol. Each of the materials was deployed into the room-scale chamber, filled with glycol smoke, using a pressurized canister at 80 psi. Results suggested that NanoActive® MgO Plus was the best smoke-clearing agent, in terms of the speed in improving visibility through the smoke-filled room (as indicated by the low $t^*_{10}$ values) (FIGS. 20 and 21). For example, by deploying approximately 50 g of NanoActive® MgO Plus into a 8 ft×8 ft×12 ft chamber filled with glycol smoke, a 10% light transmission was achieved in about 2 to 4 minutes and 20% light transmission in about 4 to 6 minutes. In contrast, glycol smoke alone achieved a 10% light transmission in more than 25 minutes. Other particles (i.e., Ca(OH)₂, NaHCO₃—FE, and NanoActive® MgO) proved to be effective smoke-clearing agents, although they were not as effective as NanoActive® MgO Plus.

Example 15

In this example, the effect of the type of smoke being cleared was examined. Following the same protocol for testing glycol smoke, experiments were conducted to evaluate the effectiveness of NanoActive® MgO Plus in clearing diesel fog in the room-scale chamber. Two amounts of NanoActive® MgO Plus (i.e., 22.9 and 48.0 g) were deployed into the chamber filled with diesel smoke and the change in light transmission through the chamber was monitored with a transmissometer. NanoActive® MgO Plus was also effective in clearing diesel/fog-oil smoke (Table 10). However, the results suggest that a larger amount of NanoActive® MgO Plus may be necessary for diesel/fog-oil smoke compared to glycol smoke to achieve the same level of smoke-clearing effectiveness. This may be due to the smaller size of the diesel/fog-oil smoke particles compared to the glycol smoke particles. Measurement of the particle-size distribution of the smoke particles with an 8-stage cascade impactor indicates that the geometric mean diameter of diesel/fog-oil smoke was less than 1 μm while that of the glycol smoke particles was approximately 2.5 μm.

TABLE 10

Amounts deployed, average mass concentrations, and $t^*_{10}$ and $t^*_{20}$ values (time to reach 10% or 20% transmission relative to smoke only) for NanoActive ® MgO Plus in the room-scale chamber with different types of smoke (glycol smoke and diesel/fog-oil smoke). NanoActive ® MgO Plus was deployed using a pressurized canister at 80 psi. The mass concentration was measured with gravimetric filter samplers.

| Type of smoke | Amount of NanoActive ™ MgO Plus deployed, g | Average mass concentration, g/m³ | $t^*_{10}$ | $t^*_{20}$ |
|---|---|---|---|---|
| Glycol Smoke | 22.6 | 0.73 | 0.15 | 0.14 |
| | 22.9 | 0.76 | 0.18 | 0.22 |
| | 48.7 | 1.32 | 0.08 | 0.07 |
| | 48.0 | 1.34 | 0.09 | 0.07 |
| Diesel smoke | 22.9 | 0.63 | 0.15 | 0.42 |
| | 48.0 | 1.00 | 0.06 | 0.21 |

Example 16

In this example, the effect of particle size on smoke-clearing effectiveness was examined. Bulk samples of NanoActive® MgO Plus and NaHCO₃—FE were size-fractionated by sieving into two size ranges: those that passed through a sieve with 25 μm opening (<25 μm), and those that passed the 53-μm sieve and were retained in the 25-μm sieve (25-53 μm). A sample from each size range was deployed into the smoke-filled chamber using a canister pressurized to 80 psi; the corresponding smoke-clearing effectiveness was monitored using a transmissometer.

Table 11 summarizes the $t^*_{10}$ and $t^*_{20}$ values and amounts deployed. The results indicated that the smaller nano-aggregates of NanoActive® MgO plus (those that passed the 25 μm sieve) were more effective in clearing glycol smoke compared to the larger nano-aggregates (those that were retained in the 25 μm sieve), although the amount deployed for the smaller particles was slightly higher than that for the larger size range (8.2 vs. 7.1 g). Additionally, comparison of the smaller nano-aggregates and the unsieved sample indicated that smoke-clearing effectiveness was slightly better (but not significantly different) for the smaller nano-aggregates than for the unsieved sample. The trend for $NaHCO_3$—FE was generally similar to that of NanoActive® MgO Plus; particles that passed the 25 μm sieve had better smoke-clearing effectiveness compared to those that were retained in the 25 μm sieve. However, in contrast with NanoActive® MgO Plus, the unsieved sample for $NaHCO_3$—FE had better smoke-clearing effectiveness than the smaller particles.

TABLE 11

Summary of $t^*_{10}$ and $t^*_{20}$ values (time to reach 10% or 20% transmission relative to smoke only) and aerodynamic particle-size distribution for different size ranges of NanoActive ® MgO plus and $NaHCO_3$-FE tested in the room-scale chamber (8 ft × 8 ft × 12 ft) with glycol smoke. A nominal amount of 10 g of NanoActive ® MgO plus and 25 g of $NaHCO_3$-FE were deployed using a canister pressurized at 80 psi. Opacity was monitored using a transmissometer.

| Particle | NaoActive ® MgO Plus | | | $NaHCO_3$-FE | | |
|---|---|---|---|---|---|---|
| Size Range | Amount deployed, g | $t^*_{10}$ | $t^*_{20}$ | Amount deployed, g | $t^*_{10}$ | $t^*_{20}$ |
| <25 μm | 8.2 | 0.35 | 0.36 | 15.6 | 0.50 | 0.36 |
| 25-53 μm | 7.1 | 0.55 | 0.53 | 16.0 | 0.66 | 0.54 |
| Unsieved | 8.5 | 0.39 | 0.44 | 15.0 | 0.39 | 0.31 |

Example 17

Figure 22:
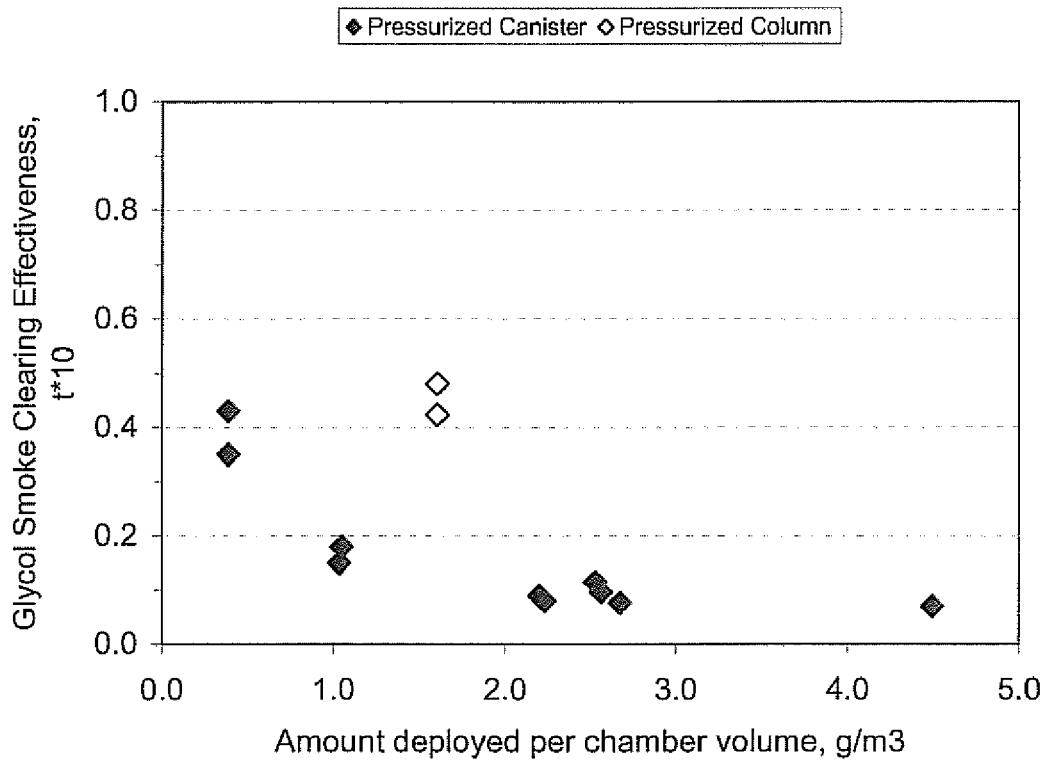
FIG. 22 is a plot comparing the glycol smoke-clearing effectiveness of NA MgO Plus delivered by a pressurized canister and a pressurized column.

In this example, the effect of delivery method on the effectiveness of selected materials in clearing glycol smoke was examined. The fire extinguisher device (or pressurized canister) was compared to another impulsive deployment method—the pressurized column—using the same pressure of 80 psi. FIG. 22 compares the two deployment methods, based on the clearing effectiveness ($t^*_{10}$) for NanoActive® MgO plus. NanoActive® MgO plus tends to perform better with the pressurized canister than with the pressurized column.

Additional tests were conducted with the pressurized canister (fire extinguisher device) to determine the effect of nozzle type on glycol smoke-clearing effectiveness of $Ca(OH)_2$, $NaHCO_3$—FE, NanoActive® MgO Plus, and NA MgO. Two types of nozzles were considered. Nozzle 1 had a constriction and was the one used for most of the smoke reduction tests; nozzle 2, on the other hand, did not have any constriction. All tests followed the same protocol for room-scale chamber studies. The results suggested that the type of nozzle has limited influence on the effectiveness of the material in clearing glycol smoke.

Example 18

Figure 23:
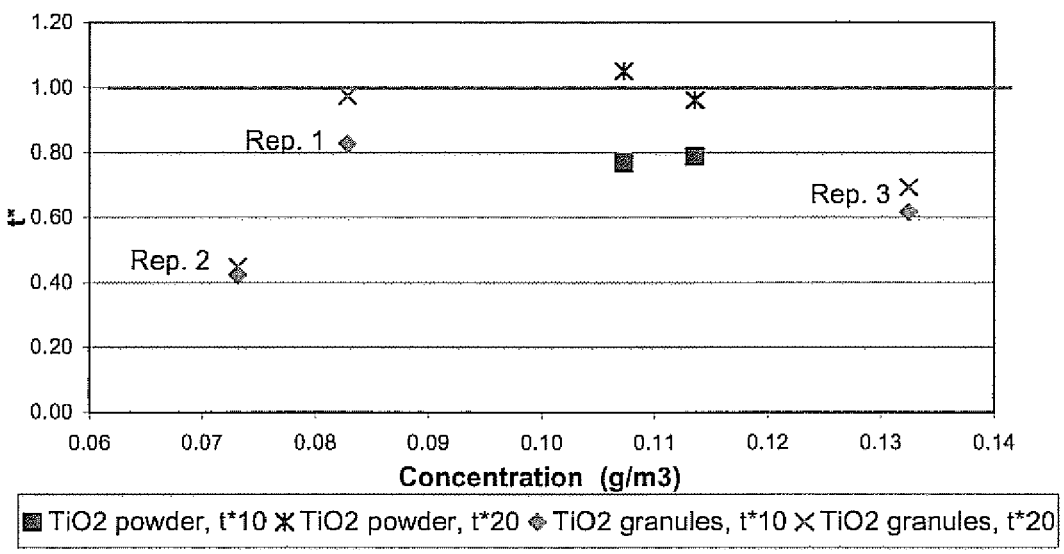
FIG. 23 is a plot comparing the effect of concentration of NA TiO$_2$-12 powder and granules on smoke-clearing effectiveness.

In this example, the glycol smoke-clearing effectiveness in a room-scale chamber was examined using granulated NanoActive®-G $TiO_2$-12 (−60, +80 mesh; 250>x>180 μm) and NanoActive® $TiO_2$-12 powder. Three repetitions of NanoActive®-G $TiO_2$-12 granules (size 180-250 micrometers) were performed at varying mass concentrations. Two repetitions of powder with a starting amount of 40 grams were performed. The mass concentrations were calculated as was done for the small-scale chamber. FIG. 23 displays $t^*_{10}$ and $t^*_{20}$ as a function of concentration. The granules generally demonstrated better effectiveness over the powder material.

Example 19

Figure 24:
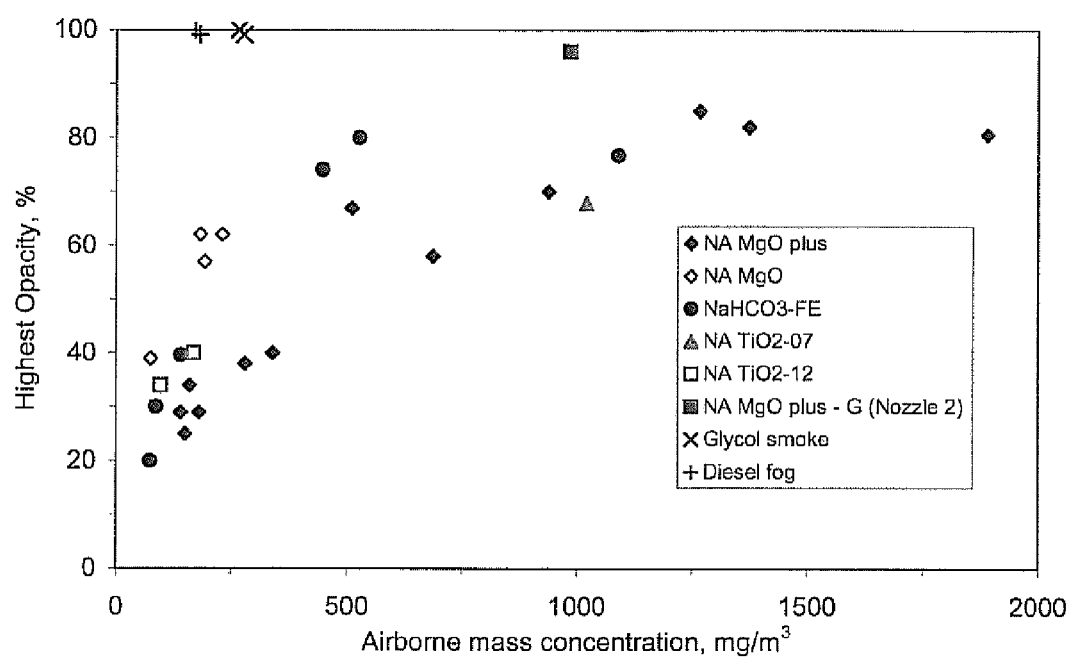
FIG. 24 is a plot comparing the degree of obscuration (indicated by % opacity) provided by selected materials deployed into a room-scale chamber using a pressurized canister at 80 psi.

In this example, the degree of obscuration of several previously tested materials was evaluated using the room-scale chamber. The degree of obscuration in the visible region of the electromagnetic spectrum provided by the different NanoActive® materials (i.e., MgO plus, MgO, $TiO_2$-12, $TiO_2$-07, MgO Plus granules) and other materials (i.e., $NaHCO_3$—FE, $Ca(OH)_2$) was evaluated. Each of the materials was deployed into the room-scale chamber using a pressurized canister at 80 psi. The degree of obscuration within the chamber was monitored using a transmissometer. Airborne particulate mass concentrations were also measured with gravimetric filter samplers. Results indicated that, for the amounts considered, the NanoActive® particles and other materials provided some obscuration in the visible region, depending on the amount and type of material. However, none of the materials considered provided as much obscuration as glycol smoke or diesel fog (FIG. 24).

Additional experiments were performed to determine if any of the NanoActive® materials would obscure thermal cameras. These experiments were conducted using the room-scale chamber. The goal was to obscure a hot body from thermal-imaging cameras (MID IR 2-5.4 μm) by the use of NanoActive® materials. A hot body (a box having circulation of hot water) was placed in an environmental chamber and a view port was placed in the Plexiglas wall of the chamber opposite to the hot body. A mid-range thermal-imaging camera was set up at the view port so that the hot body could be viewed. NanoActive® materials (NanoActive® MgO, NanoActive® $Al_2O_3$ and NanoActive® $Al_2O_3$ plus) were sprayed in the chamber from a pressurized canister. As soon as the materials were sprayed, the temperature of the hot body as given by the camera dropped by about 3-10° C. The temperature drop lasted a very short time—that is about 30 seconds to 3 minutes, and then the temperature given by the camera returned to normal.

Example 20

In this example, the effectiveness of a mixture of NanoActive® $TiO_2$ and NanoActive® MgO (available as FAST ACT® from NanoScale Materials, Inc.) in sorbing HF and HCN (two common toxic materials produced by fires) was examined. Approximately 50 g of the nanocrystalline material was exposed to HCN and was subsequently analyzed to determine the presence of HCN decomposition product which would indicate sorption of HCN by the nanocrystalline material. After exposure to HCN, the nanocrystalline material underwent solvent extraction and GC-MS analysis tests. This data reveals that the nanocrystalline material oxidizes HCN to an OCN— intermediate that is further hydrolyzed to byproducts that are stabilized by the nanocrystalline materials at room temperature. The signature decomposition product characteristic to HCN was N,N-Bis-hydroxymethyl formamide (visible in a methanol extract).

Similar tests were performed using HF. However, no signature decomposition products could be identified by solvent extraction and GC-MS. This indicates that the HF was chemically decomposed by the nanocrystalline materials, particularly the MgO, and formed magnesium fluoride, a highly stable ionic compound that is not easily extractable by any solvent. Thus, the results indicate that these nanocrystalline materials are highly effective in sorbing HCN and HF.

Example 21

In this example, the effectiveness of the nanocrystalline mixture used in Example 20 was tested for effectiveness in removal of vapor hazards such as anhydrous ammonia, chlorine, ethylene oxide, hydrogen chloride, nitrogen dioxide, and sulfur dioxide, all compounds which can be formed and released by fires. Adsorption of gases was determined using FT-IR spectroscopy and gravimetric measurements. Since chlorine is a symmetrical molecule, IR spectroscopy could not be employed. Therefore, the amount of adsorbed chlorine was calculated based on the weight gain of the nanocrystalline particles upon exposure to chlorine gas.

The percent of hazard removed at 2 and 10 minutes is given in Table 12.

TABLE 12

Removal of Gaseous Toxic Chemicals

| | | % Agent Removed | |
|---|---|---|---|
| Agent | Formula | 2 min | 10 min |
| Anhydrous Ammonia | $NH_3$ | 97.9 ± 0.4 | 98.6 ± 0.1 |
| Chlorine | $Cl_2$ | 100 ± 0.0 | 100 ± 0.0 |
| Ethylene Oxide | $CH_2OCH_2$ | 97.4 ± 2.4 | 99.8 ± 0.2 |
| Hydrogen Chloride | HCl | 100 ± 0.0 | 100 ± 0.0 |
| Nitrogen Dioxide | $NO_2$ | 97.7 ± 0.4 | 97.8 ± 0.5 |
| Sulfur Dioxide | $SO_2$ | 100 ± 0.0 | 100 ± 0.0 |
| Methyl Mercaptan | $CH_3SH$ | 96.4 ± 1.4 | 99.1 ± 0.6 |

The gases are adsorbed very rapidly and, as indicated by the 10 minute data, they do not appear to outgas from the powder.

We claim:

1. A method of fire suppression comprising the step of applying a quantity of nanocrystalline particles onto an open flame or smoldering material, said nanocrystalline particles having an average crystallite size of less than about 25 nm and a surface area of at least about 15 $m^2/g$, said nanocrystalline particles being selected from the group consisting of: the metal oxides of Mg, Sr, Ba, Ca, Fe, V, Mn, Ni, Cu, Al, and Ag; the metal hydroxides of Na, Mg, Sr, Ba, Ca, Fe, V, Mn, Ni, Cu, Al, and Ag; carbonate compounds; bicarbonate compounds; phosphorus: inorganic phosphorous compounds; boron compounds; antimony compounds; molybdenum compounds; titanium compounds; zirconium compounds; zinc compounds; sulfamates; sulfates; bromine compounds; chlorine compounds; and mixtures thereof.

2. The method of claim 1, said application step comprising spraying said nanocrystalline particles onto said fire from a pressurized container.

3. The method of claim 2, said nanocrystalline particles being dispensed from said pressurized container at a pressure of between about 20-3000 psi.

4. The method of claim 2, said container being pressurized with a delivery gas.

5. The method of claim 1, said nanocrystalline particles having a settling velocity of between about 0.001-5 cm/s.

6. The method of claim 1, said nanocrystalline particles being manually dispersed from a non-pressurized container.

7. The method of claim 1, said nanocrystalline particles being selected from the group consisting of the metal oxides and hydroxides of Sb, Mo, Ti, Zr, Zn, and mixtures thereof.

8. The method of claim 1, said nanocrystalline particles being combined with an inorganic chemical selected from the group consisting of ammonium phosphate, ammonium sulfate, calcium carbonate, magnesium aluminosilicate, and monoammonium phosphate.

* * * * *